United States Patent
Ito et al.

(10) Patent No.: US 11,239,482 B2
(45) Date of Patent: Feb. 1, 2022

(54) FLOW BATTERY

(71) Applicant: Panasonic Intellectual Property Management Co., Ltd., Osaka (JP)

(72) Inventors: Shuji Ito, Nara (JP); Masahisa Fujimoto, Osaka (JP); Haruko Kubota, Osaka (JP); Norihiko Kawabata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 16/542,296

(22) Filed: Aug. 15, 2019

(65) Prior Publication Data

US 2019/0372146 A1 Dec. 5, 2019

Related U.S. Application Data

(63) Continuation of application No. PCT/JP2018/048561, filed on Dec. 28, 2018.

(30) Foreign Application Priority Data

May 21, 2018 (JP) .............................. JP2018-097327

(51) Int. Cl.
*H01M 8/18* (2006.01)
*H01M 8/04186* (2016.01)

(52) U.S. Cl.
CPC ....... *H01M 8/188* (2013.01); *H01M 8/04186* (2013.01)

(58) Field of Classification Search
None
See application file for complete search history.

(56) References Cited

U.S. PATENT DOCUMENTS

| 4,585,536 A | 4/1986 | Puetter et al. |
| 2011/0189520 A1* | 8/2011 | Carter ................. H01M 8/0206 429/107 |

(Continued)

FOREIGN PATENT DOCUMENTS

| EP | 3024080 | 5/2016 |
| EP | 3166168 A1 | 5/2017 |

(Continued)

OTHER PUBLICATIONS

International Search Report of PCT application No. PCT/JP2018/048561 dated Mar. 19, 2019.

(Continued)

*Primary Examiner* — Wyatt P McConnell
(74) *Attorney, Agent, or Firm* — McDermott Will and Emery LLP

(57) ABSTRACT

The flow battery in an aspect of the present disclosure includes a first liquid containing a lithium ion and a first redox material, a first electrode in contact with the first liquid, a second electrode functioning as a counter electrode of the first electrode, an isolation unit that isolates the first electrode and the second electrode from each other, a first chamber, and a first circulation mechanism for circulating the first liquid between the first electrode and the first chamber, and in the flow battery, the first liquid is non-aqueous and the first circulation mechanism includes a magnetically driven pump.

17 Claims, 5 Drawing Sheets

(56) References Cited

U.S. PATENT DOCUMENTS

| | | | |
|---|---|---|---|
| 2012/0135278 A1 | 5/2012 | Yoshie et al. | |
| 2014/0030623 A1* | 1/2014 | Chiang | H01M 8/225 |
| | | | 429/434 |
| 2015/0044539 A1* | 2/2015 | Li | H01M 10/6553 |
| | | | 429/120 |
| 2015/0147611 A1* | 5/2015 | Cipriano | H01M 8/188 |
| | | | 429/70 |
| 2015/0255803 A1* | 9/2015 | Delnick | H01M 4/9041 |
| | | | 429/498 |
| 2018/0048004 A1 | 2/2018 | Hojo | |
| 2018/0097248 A1 | 4/2018 | Nariyama et al. | |
| 2019/0058208 A1 | 2/2019 | Fujimoto et al. | |

FOREIGN PATENT DOCUMENTS

| | | |
|---|---|---|
| JP | 59-205491 | 11/1984 |
| JP | 5417441 B | 2/2014 |
| JP | 2016-527678 | 9/2016 |
| WO | 2016/208123 | 12/2016 |
| WO | 2018/016249 | 1/2018 |

OTHER PUBLICATIONS

Chuankun Jia et al., "High-energy density nonaqueous all redox flow lithium battery enabled with a polymeric membrane", Science Advances, vol. 1, No. 10, e1500886, Nov. 27, 2015.

The Extended European Search Report dated Jul. 19, 2021 for the related European Patent Application No. 18906707.7.

\* cited by examiner

FLOW BATTERY

TECHNICAL FIELD

The present disclosure relates to a flow battery.

BACKGROUND ART

PTL 1 discloses a redox flow battery in which a slurry-like negative electrode liquid containing solid negative electrode active material particles consisting of metal particles and a non-aqueous solvent is used.

NPL 1 and PTL 2 disclose a redox flow battery in which a non-aqueous solvent is circulated between a chamber for containing a solid negative electrode active material and an electrode using a tube pump.

CITATION LIST

Patent Literatures

PTL 1: Japanese Patent No. 5417441
PTL 2: PCT International Publication No. 2016/208123

Non-Patent Literature

NPL 1: Jia et al. Sci. Adv. 2015; 27 November 2015

SUMMARY OF THE INVENTION

Technical Problem

In the prior art, it is desirable to realize a flow battery equipped with both a high energy density and high reliability.

Solution to Problem

An aspect of the present disclosure provides a flow battery, which includes a first liquid containing a lithium ion and a first redox material, a first electrode in contact with the first liquid, a second electrode functioning as a counter electrode of the first electrode, an isolation unit that isolates the first electrode and the second electrode from each other, a first chamber, and a first circulation mechanism for circulating the first liquid between the first electrode and the first chamber and in which the first liquid is non-aqueous and the first circulation mechanism includes a magnetically driven pump.

ADVANTAGEOUS EFFECT OF INVENTION

According to the present disclosure, it is possible to realize a flow battery equipped with both a high energy density and high reliability.

DESCRIPTION OF EMBODIMENTS

Figure 1:
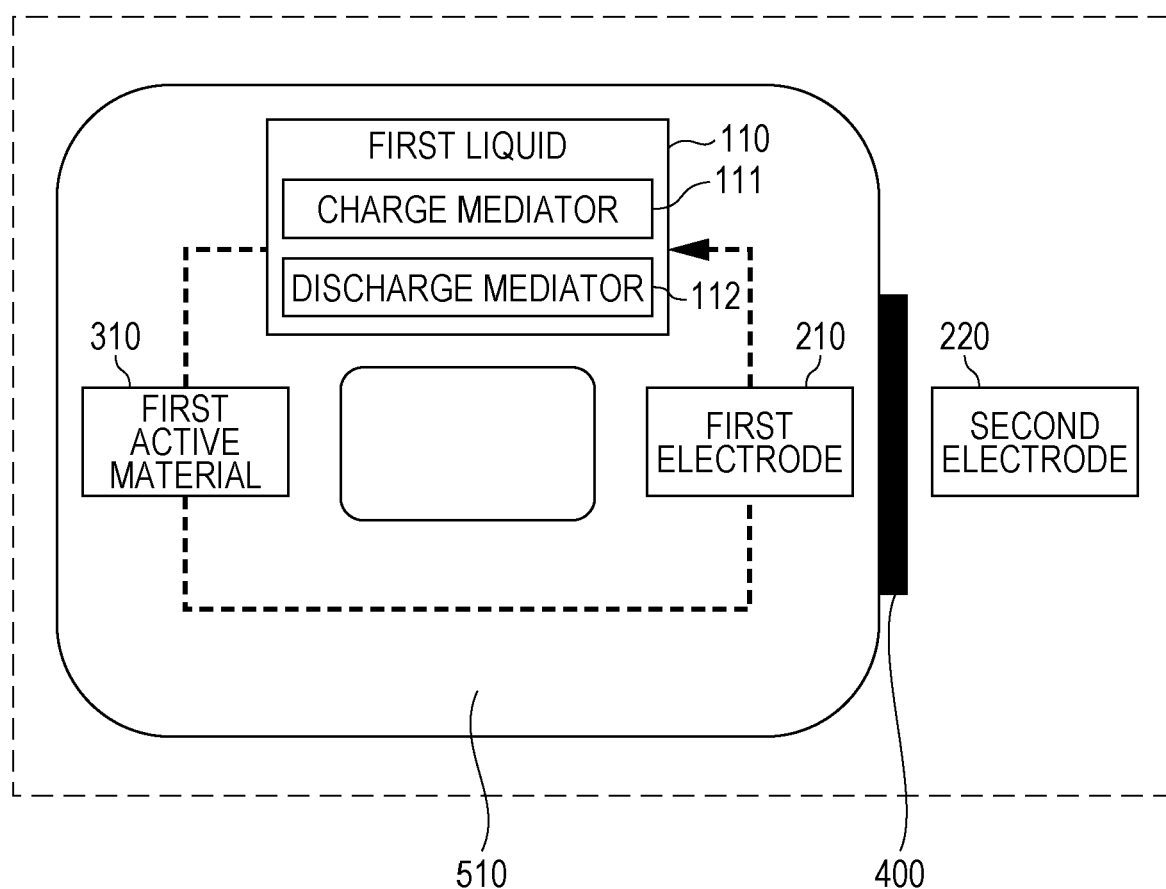
FIG. 1 is a block diagram of a flow battery according to a first embodiment.

The present disclosure includes the flow battery described in each of the following items.

[Item 1]

A flow battery according to item 1 of the present disclosure includes:
a first liquid containing a lithium ion and a first redox material;
a first electrode in contact with the first liquid;
a second electrode functioning as a counter electrode of the first electrode;
an isolation unit that isolates the first electrode and the second electrode from each other;
a first chamber; and
a first circulation mechanism for circulating the first liquid between the first electrode and the first chamber, and in the flow battery,
the first liquid is non-aqueous and
the first circulation mechanism includes a magnetically driven pump.

According to the present disclosure, it is possible to realize a flow battery equipped with both a high energy density and high reliability. Moreover, according to the flow battery of the present disclosure, it is possible to realize a flow battery having a high discharge potential, a high energy density, and a long cycle life.

[Item 2]

In the flow battery according to item 1, the magnetically driven pump may include a casing and an impeller, an inner surface of the casing may be formed of a resin nonreactive with lithium, and a surface of the impeller may be formed of the resin nonreactive with lithium.

[Item 3]

In the flow battery according to item 2, the resin nonreactive with lithium may be a polyolefin-based resin.

[Item 4]

In the flow battery according to item 3, the polyolefin-based resin may be at least one selected from the group consisting of polyethylene and polypropylene.

[Item 5]

In the flow battery according to item 2, the resin nonreactive with lithium may contain at least one selected from the group consisting of polyethylene and polypropylene.

[Item 6]

In the flow battery according to any one of items 1 to 5, the first redox material may be an aromatic compound.

[Item 7]

In the flow battery according to any one of items 1 to 6, a first active material having a property to contain and release lithium may be immersed in the first liquid.

[Item 8]

In the flow battery according to item 7, the first active material and the first liquid may be contained in the first chamber.

[Item 9]

In the flow battery according to item 7 or 8, the first redox material may contain a charge mediator and a discharge mediator,
an equilibrium potential of the charge mediator may be lower than an equilibrium potential of the first active material, and an equilibrium potential of the discharge mediator may be higher than an equilibrium potential of the first active material.

[Item 10]

In the flow battery according to item 9, lithium may be dissolved in the first liquid, and during charge, the charge mediator may be reduced on the first electrode and the first active material may contain the lithium as well as the charge mediator reduced on the first electrode may be oxidized by the first active material, and during discharge, the first active material may release the lithium as well as the first active material containing the lithium may reduce the discharge mediator and the discharge mediator reduced by the first active material may be oxidized on the first electrode.

[Item 11]

In the flow battery according to item 10, during the charge, the discharge mediator may be reduced on the first electrode, and during the discharge, the charge mediator may be oxidized on the first electrode.

[Item 12]

In the flow battery according to any one of items 9 to 11, the charge mediator may be at least one selected from the group consisting of phenanthrene, biphenyl, o-terphenyl, triphenylene, anthracene, acenaphthene, acenaphthylene, and fluoranthene.

[Item 13]

In the flow battery according to any one of items 9 to 12, the discharge mediator may be at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, benzil, and tetraphenylcyclopentadienone.

[Item 14]

In the flow battery according to any one of items 1 to 13, the first liquid may be an ether solution.

[Item 15]

In the flow battery according to any one of items 7 to 14, the first active material may contain graphite.

[Item 16]

In the flow battery according to any one of items 1 to 15, the flow battery may further include:

a second liquid containing a second redox material; and a second active material immersed in the second liquid, the second electrode may be immersed in the second liquid, the isolation unit may isolate the first electrode from the second electrode, the isolation unit may isolate the first liquid from the second liquid, the second redox material may be oxidized or reduced on the second electrode, and the second redox material may be oxidized or reduced by the second active material.

[Item 17]

In the flow battery according to item 16, lithium may be dissolved in the second liquid, the second active material may have property to contain and release the lithium, during charge, the second redox material may be oxidized on the second electrode and the second active material may release the lithium as well as the second redox material oxidized on the second electrode may be reduced by the second active material, and during discharge, the second redox material may be reduced on the second electrode and the second active material may contain the lithium as well as the second redox material reduced on the second electrode may be oxidized by the second active material.

[Item 18]

In the flow battery according to item 16 or 17, the second redox material may be tetrathiafulvalene.

[Item 19]

In the flow battery according to any one of items 16 to 18, the second active material may contain lithium iron phosphate.

[Item 20]

In the flow battery according to any one of items 16 to 19, the flow battery may include a second chamber for containing the second liquid, the second electrode, and the second active material; and a second circulation mechanism for circulating the second liquid between the second electrode and the second chamber, the second redox material may be oxidized or reduced by the second active material by contact of the second active material and the second liquid with each other in the second chamber.

Hereinafter, embodiments of the present disclosure will be described with reference to the drawings.

First Embodiment

FIG. 1 is a block diagram exemplarily illustrating a schematic configuration of flow battery 1000 in a first embodiment.

Flow battery 1000 according to the first embodiment includes first liquid 110, first electrode 210, and first active material 310.

First liquid 110 is a non-aqueous liquid in which charge mediator 111 and discharge mediator 112, which are first redox materials, are dissolved.

First electrode 210 is an electrode in contact with first liquid 110.

First active material 310 is an active material to be immersed in first liquid 110.

The equilibrium potential of charge mediator 111 is lower than the equilibrium potential of first active material 310.

The equilibrium potential of discharge mediator 112 is higher than the equilibrium potential of first active material 310.

First circulation mechanism 510 includes a magnetically driven pump. It is desirable that the magnetically driven pump circulate first liquid 110 between first electrode 210 and first active material 310, and a portion in contact with first liquid 110 is composed of a resin nonreactive with lithium. To be nonreactive with lithium means that the substance does not chemically react with lithium and does not change the state of lithium. The resin nonreactive with lithium may be a polyolefin-based resin. The polyolefin-based resin may contain one or more kinds selected from the group consisting of polyethylene and polypropylene.

According to the above configuration, it is possible to realize a flow battery equipped with all of a high energy density, a long cycle life, and high reliability.

In other words, according to the above configuration, it is possible to realize a flow battery having a configuration in which an active material itself is not circulated while the active material is utilized. For this reason, as first active material 310, for example, a powdery active material having a high capacity can be used in the charge and discharge reaction. This makes it possible to realize a high energy density and a high capacity.

The magnetically driven pump is driven by a magnet, and it is thus possible to rotate an impeller in a sealed vessel. As a result, sealless driving of the magnetically driven pump is possible. In addition, the portion to be in contact with first liquid 110 can be composed of a resin nonreactive with first liquid 110 in which the mediator which is the first redox material is dissolved, and thus the deterioration of the magnetically driven pump due to the swelling or reaction caused by the contact of the pump with first liquid 110 can be suppressed and the magnetically driven pump is highly reliable.

Moreover, according to the above configuration, liquid leakage due to the deterioration of the first liquid and the deterioration of the resin due to the contact and reaction of the first liquid with the resin constituting the pump is suppressed. Hence, it is possible to realize a flow battery having a long cycle life and high reliability.

In addition, according to the above configuration, it is possible to use a material having a relatively low equilibrium potential (V vs. Li/Li$^+$) as discharge mediator 112 by using an active material having a relatively low equilibrium potential (V vs. Li/Li$^+$) as first active material 310. The material which has a relatively low equilibrium potential and is used as first active material 310 may be, for example, graphite. The material which has a relatively low equilibrium potential and is used as discharge mediator 112 may be, for example, an aromatic compound. The aromatic compound may be, for example, a condensed aromatic compound. This makes it possible to realize a negative electrode of a flow battery having a lower potential. For this reason, it is possible to realize a flow battery having a high battery voltage.

Incidentally, in flow battery 1000 according to the first embodiment, lithium may be dissolved in first liquid 110.

First active material 310 may be a material having a property to contain and release lithium.

At the time of charge of flow battery 1000, electrons are supplied from the outside of flow battery 1000 to first electrode 210. At the time of charge of flow battery 1000, charge mediator 111 is reduced on first electrode 210. Furthermore, first active material 310 may contain lithium as well as charge mediator 111 reduced on first electrode 210 may be oxidized by first active material 310 at the time of charge of flow battery 1000.

At the time of discharge of flow battery 1000, electrons are released from first electrode 210 to the outside of flow battery 1000. At the time of discharge of flow battery 1000, first active material 310 releases lithium as well as first active material 310 containing lithium reduces discharge mediator 112. Furthermore, discharge mediator 112 reduced by first active material 310 may be oxidized on first electrode 210 at the time of discharge of flow battery 1000.

According to the above configuration, for example, an active material having a property to reversibly contain and release lithium and/or lithium ions can be used as first active material 310. This makes the material design of first active material 310 easier. Moreover, a higher capacity can be realized.

In addition, at the time of charge of flow battery 1000 according to the first embodiment, the discharge mediator 112 may be reduced on the first electrode 210.

In addition, at the time of discharge, charge mediator 111 may be oxidized on first electrode 210.

According to the above configuration, a higher energy density and a higher capacity can be realized. In other words, it is possible to increase the amount of discharge mediator 112 to be oxidized on first electrode 210 at the time of discharge by reducing discharge mediator 112 on first electrode 210 at the time of charge. Furthermore, it is possible to increase the amount of charge mediator 111 to be reduced on first electrode 210 at the time of charge by oxidizing charge mediator 111 on first electrode 210 at the time of discharge. This makes it possible to increase the capacity of charge and discharge.

For example, as first liquid 110 comes into contact with first electrode 210, charge mediator 111 and discharge mediator 112 are oxidized or reduced on first electrode 210.

For example, as first liquid 110 comes into contact with first active material 310, a reduction reaction of discharge mediator 112 by first active material 310 takes place or an oxidation reaction of charge mediator 111 by first active material 310 takes place.

In addition, in flow battery 1000 according to the first embodiment, charge mediator 111 and discharge mediator 112 may be aromatic compounds or condensed aromatic compounds.

In first liquid 110 in which an aromatic compound is dissolved, an aromatic compound dissolved in a solvent (namely, an aromatic compound solvated with a solvent) receives an electron from lithium, and the aromatic compound incorporates the electron as a solvated electron.

According to the above configuration, it is possible to realize charge mediator 111 and discharge mediator 112 which have potentially less noble properties. A solution containing an aromatic compound has the ability to dissolve lithium. A solution containing an aromatic compound may be, for example, an ether solution. In other words, the first liquid is non-aqueous. Lithium is likely to be a cation as an electron is detached from lithium. For this reason, lithium transfers an electron to the aromatic compound in the solution, becomes a cation, and is thus dissolved in the solution. At this time, the aromatic compound which has received the electron is solvated with the electron. The aromatic compound behaves as an anion as the aromatic compound is solvated with the electron. For this reason, the solution containing an aromatic compound itself has ion conductivity. Here, in the solution containing an aromatic compound, a Li cation and an electron are present in equivalents. For this reason, it is possible to impart a strongly reducing property, namely, potentially less noble property to the solution containing an aromatic compound itself.

For example, when an electrode which does not react with lithium is immersed in first liquid 110 in which an aromatic compound is dissolved and the potential of the electrode with the lithium metal is measured, a considerably less noble potential is observed. The potential observed is determined depending on the degree of solvation of the aromatic compound with the electron, namely, the kind of aromatic compound. Examples of the aromatic compound which generates a less noble potential include phenanthrene, biphenyl, o-terphenyl, triphenylene, anthracene, acenaphthene, acenaphthylene, fluoranthene, 1,10-phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, benzil, and tetraphenylcyclopentadienone. Moreover, examples of the compound which generates a less noble potential also include amine compounds such as ethylenediamine.

In addition, in flow battery 1000 according to the first embodiment, charge mediator 111 may be at least one selected from the group consisting of phenanthrene, biphenyl, o-terphenyl, triphenylene, anthracene, acenaphthene, acenaphthylene, and fluoranthene.

According to the above configuration, it is possible to realize charge mediator 111 having potentially less noble property. More specifically, for example, it is possible to realize a charge mediator which exhibits a less noble potential (V vs. Li/Li$^+$) than the potential (V vs. Li/Li$^+$) of specific first active material 310 such as graphite.

In addition, in flow battery 1000 according to the first embodiment, discharge mediator 112 may be at least one selected from the group consisting of 1,10-phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, ethylenediamine, benzil, and tetraphenylcyclopentadienone.

According to the above configuration, it is possible to realize discharge mediator 112 having potentially noble property. More specifically, it is possible to realize discharge mediator 112 which exhibits a nobler potential (V vs. Li/Li$^+$) than the potential (V vs. Li/Li$^+$) of specific first active material 310. First active material 310 may be, for example, graphite.

In addition, in flow battery 1000 according to the first embodiment, discharge mediator 112 may be at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, benzil, and tetraphenylcyclopentadienone.

According to the above configuration, it is possible to realize discharge mediator 112 having potentially noble property. More specifically, it is possible to realize discharge mediator 112 which exhibits a nobler potential (V vs. Li/Li$^+$) than the potential (V vs. Li/Li$^+$) of specific first active material 310. First active material 310 may be, for example, graphite. Furthermore, the equilibrium potential (V vs. Li/Li$^+$) of discharge mediator 112 can be set to be relatively low. This makes it possible to realize a negative electrode of a flow battery having a lower potential. For this reason, it is possible to realize a flow battery having a high battery voltage.

In addition, in flow battery 1000 according to the first embodiment, first liquid 110 may be an ether solution.

According to the above configuration, it is possible to realize an electrolytic solution containing charge mediator 111 and discharge mediator 112 as first liquid 110. In other words, the solvent of charge mediator 111 and discharge mediator 112 is an ether solution which does not have electron conductivity, and thus the ether solution itself can have properties as an electrolytic solution.

As the ether, tetrahydrofuran (THF), 2-methyltetrahydrofuran (2MeTHF), dimethoxyethane (DME), 1,3-dioxane (1,3DO), 4-methyl-1,3-dioxane (4Me1,3DO) and the like can be used.

Moreover, in flow battery 1000 according to the first embodiment, first active material 310 may contain graphite.

According to the above configuration, the equilibrium potential (V vs. Li/Li$^+$) of first active material 310 can be set to be relatively low. For this reason, it is possible to use a material having a relatively low equilibrium potential (V vs. Li/Li$^+$) as discharge mediator 112. The material which has a relatively low equilibrium potential and is used as discharge mediator 112 may be, for example, a condensed aromatic compound. This makes it possible to realize a negative electrode of a flow battery having a lower potential. For this reason, it is possible to realize a flow battery having a high battery voltage (discharge voltage).

Incidentally, in the first embodiment, the composition of graphite containing lithium, namely, a graphite intercalation compound generated at the time of charge as first active material 310 may be at least one of $C_{24}Li$, $C_{18}Li$, $C_{12}Li$, or $C_6Li$.

In the case of using graphite as first active material 310, graphite reacts with lithium, is completely reduced, and is charged. In other words, graphite contains lithium and becomes $C_6Li$. At this time, the potential of this $C_6Li$ is about 0.15 V vs. Li/Li$^+$. For this reason, it is possible to configure a mediator type negative electrode when an aromatic compound exhibiting a potential less noble than the potential of $C_6Li$ is used as a charge mediator and an aromatic compound exhibiting a potential nobler than the potential of $C_6Li$ is used as a discharge mediator.

Tables 1, 2 and 3 show the measurement results on the potential of aromatic compounds which contains condensed aromatic compounds and can be used as charge mediator 111.

TABLE 1

| Compound | Molar concentration (mol/L) | Potential (V vs. Li/Li$^+$) | Li metal | $C_6Li$ |
|---|---|---|---|---|
| Phenanthrene 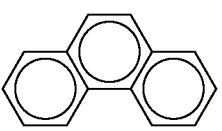 | 1 | 0.03 | Dissolved (deep green) | Not changed |
| Biphenyl 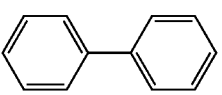 | 1 | 0 | Dissolved (navy blue) | Not changed |

TABLE 1-continued

| Compound | Molar concentration (mol/L) | Potential (V vs. Li/Li$^+$) | Li metal | C$_6$Li |
|---|---|---|---|---|
| o-Terphenyl 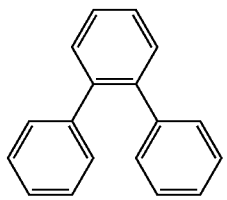 | 1 | 0.15 | Dissolved (dark red) | Not changed |

TABLE 2

| Compound | Molar concentration (mol/L) | Potential (V vs. Li/Li$^+$) |
|---|---|---|
| Triphenylene 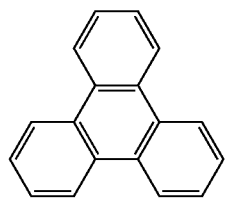 | 0.1 | 0.01 |
| Anthracene 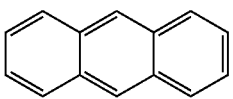 | 0.1 | 0.05 |

TABLE 3

| Compound | Molar concentration (mol/L) | Potential (V vs. Li/Li$^+$) |
|---|---|---|
| Acenaphthene 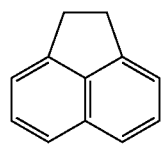 | 0.1 | 0.016 |

TABLE 3-continued

| Compound | Molar concentration (mol/L) | Potential (V vs. Li/Li$^+$) |
|---|---|---|
| Acenaphthylene | 0.1 | 0.014 |
| Fluoranthene | 0.1 | 0.014 |

Tables 4, 5 and 6 show the measurement results on the potential of aromatic compounds containing condensed aromatic compounds and amine compounds which can be used as discharge mediator 112.

TABLE 4

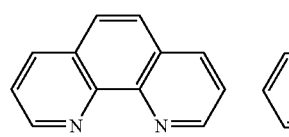 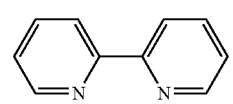 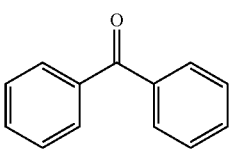 [SMILES: O=C(c1ccccc1)c1ccccc1] 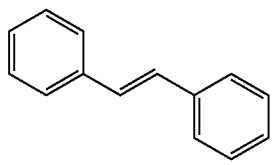 [SMILES: C(=C\c1ccccc1)/c1ccccc1]

| Compound | 1,10-Phenanthroline | 2,2'-Bipyridyl | Benzophenone | trans-Stilbene |
|---|---|---|---|---|
| Molar concentration (mol/L) | 0.1 | 1 | 1 | 0.5 |
| Li metal | Dissolved (yellow) | Dissolved (red) | Dissolved (blue) | Dissolved (dark red) |

TABLE 4-continued

| | | | |
|---|---|---|---|
| Compound | 1,10-Phenanthroline | 2,2'-Bipyridyl | Benzophenone | trans-Stilbene |
| $C_6Li$ | Li elimination (yellow) | Li elimination (red) | Li elimination (blue) | Li elimination (dark red) |
| Reaction rate | Slow | Slightly fast | Fast | Significantly slow |
| Potential (V vs. Li/Li⁺) | 1.78 | 0.4 | 0.78 | 0.3 |

TABLE 5

| Compound | Molar concentration (mol/L) | Potential (V vs. Li/Li⁺) |
|---|---|---|
| 4,4'-Bipyridyl | 0.1 | 1.22 |
| 3,3'-Bipyridyl | 0.1 | 2.5 |
| 2,4'-Bipyridyl | 0.1 | 0.54 |
| 2,3'-Bipyridyl | 0.1 | 0.58 |
| cis-Stilbene | 0.1 | 0.43 |
| Acetophenone | 0.1 | 1.29 |
| Propiophenone | 0.1 | 0.42 |
| Butyrophenone | 0.1 | 0.3 |
| Valerophenone | 0.1 | 0.31 |
| Ethylenediamine | 0.1 | 0.36 |

TABLE 6

| Compound | Molar concentration (mol/L) | Potential (V vs. Li/Li⁺) |
|---|---|---|
| Benzil | 0.1 | 0.16 |

TABLE 6-continued

| Compound | Molar concentration (mol/L) | Potential (V vs. Li/Li$^+$) |
| --- | --- | --- |
| Tetraphenylcyclopentadienone | 0.1 | 0.34 |

A 2×2 cm copper foil wrapped with a polypropylene microporous separator was entirely wrapped with a large amount of lithium metal foil. Subsequently, tabs were attached to the copper foil and the lithium metal. Thereafter, a laminate outer packaging was attached to this. After 2MeTHF in which various compounds were dissolved at the respective molar concentrations (mol/L) presented in from Table 1 to Table 6 was injected into this, the laminate outer packaging was sealed by heat seal. A cell for potential measurement was thus fabricated for each compound. The potentials (V vs. Li/Li$^+$) measured using these cells for potential measurement based on lithium metal are presented in from Table 1 to Table 6. Incidentally, 2MeTHF was used as the ether in this measurement, but other ethers can be also used in the same manner.

A Li metal was dissolved in a 2MeTHF solution in which a charge mediator was dissolved at a concentration of 0.1 mol/L. Graphite was immersed in this solution for four days. Thereafter, it was confirmed by color change that graphite (black) was converted to $C_6Li$ (gold). In addition, $C_6Li$ was immersed in a 2MeTHF solution in which a discharge mediator was dissolved at a concentration of 0.1 mol/L for four days. Thereafter, it was confirmed by color change that $C_6Li$ (gold) was converted to graphite (black). This change from gold to black was visually observed, and the reaction rate at which Li in various compounds listed in Table 4 was eliminated was relatively evaluated.

In addition, a change in the case of immersing $C_6Li$ and lithium metal in 2MeTHF in which various compounds are dissolved is presented in Table 1 and Table 4.

As presented in Table 1 and Table 4, lithium metal is dissolved and the respective solutions are colored in both the case of charge mediator 111 and the case of discharge mediator 112.

As presented in Table 1, it can be seen that charge mediator 111 does not have ability to dissolve Li in $C_6Li$.

On the other hand, as presented in Table 4, it can be seen that discharge mediator 112 has ability to dissolve Li in $C_6Li$.

This difference in ability can be explained by the difference between the potentials of these lithium metal solutions and the potential of $C_6Li$. In other words, those having a potential nobler than the potential (about 0.15 V vs. Li/Li$^+$) of $C_6Li$ have the ability to dissolve Li in $C_6Li$. On the other hand, those having a potential less noble than the potential (about 0.15 V vs. Li/Li$^+$) of $C_6Li$ does not have the ability to dissolve Li in $C_6Li$.

Hence, it is possible to use those having a potential less noble than that of $C_6Li$ as charge mediator 111. In addition, it is possible to use those having a potential nobler than that of $C_6Li$ as discharge mediator 112.

Incidentally, as the aromatic compound, those that have a smaller difference in potential from first active material 310 exhibit superior charge and discharge energy efficiency. Hence, phenanthrene, triphenylene, or biphenyl may be used as charge mediator 111 in the case of using graphite as first active material 310. In addition, trans-stilbene, butyrophenone, valerophenone, or ethylenediamine may be used as discharge mediator 112. This makes it possible to further increase the charge and discharge energy efficiency.

Incidentally, an ether which is not co-inserted into graphite together with lithium ions may be used as the ether. By this, the ether is not co-inserted into graphite and the capacity density can be further improved.

Incidentally, a powdery active material may be used as first active material 310. In a case in which first active material 310 is filled into the tank in a powder state without being processed, the manufacture can be simplified and the manufacturing cost can be reduced.

In addition, a pellet-shaped active material may be used as first active material 310. The pellet-shaped active material may be, for example, an active material in a state in which a powder is pelletized. In a case in which first active material 310 is filled into the tank in a pellet shape, the manufacture can be simplified and the manufacturing cost can be reduced.

In addition, an active material solidified into a pellet shape using a known binder may be used as first active material 310. Examples of the binder include polyvinylidene fluoride, polypropylene, polyethylene, and polyimide.

Incidentally, first active material 310 may be a material insoluble in first liquid 110. This makes it possible to realize a flow battery having a configuration in which charge mediator 111 and discharge mediator 112 are circulated together with first liquid 110 but first active material 310 is not circulated.

Incidentally, in flow battery 1000 according to the first embodiment, first electrode 210 may be a negative electrode and second electrode 220 may be a positive electrode.

Incidentally, first electrode 210 may also be a positive electrode if an electrode having a relatively low potential is used as second electrode 220.

In other words, first electrode 210 may be a positive electrode and second electrode 220 may be a negative electrode.

First electrode 210 may be an electrode having a surface which acts as a reaction site of charge mediator 111 and discharge mediator 112.

In this case, a material which is stable with respect to first liquid 110 may be used as first electrode 210. Furthermore, a material which is stable with respect to an electrochemical reaction of an electrode reaction may be used as first electrode 210. For example, a metal and carbon may be used as first electrode 210. The metal may be, for example, stainless steel, iron, copper, and nickel.

First electrode 210 may be one having a structure of which the surface area is increased. The one having a structure of which the surface area is increased may be, for example, a mesh, a non-woven fabric, a surface-roughened plate, and a sintered porous body. According to this, the specific surface area of first electrode 210 is increased. This makes it possible to more easily progress the oxidation reaction or reduction reaction of charge mediator 111 and discharge mediator 112.

Second electrode 220 may be configured to include a current collector and an active material provided on the current collector. This makes it possible to use, for example, active material having a high capacity. As an active material for second electrode 220, a compound having a property to reversibly contain and release lithium ions may be used.

In addition, second electrode 220 may be lithium metal. In a case in which lithium metal is used as second electrode 220, it is easy to control the dissolution and deposition as a metal positive electrode and it is possible to realize a high capacity.

Incidentally, flow battery 1000 according to the first embodiment may further include isolation unit 400.

Isolation unit 400 isolates first electrode 210 and first liquid 110 from second electrode 220.

Isolation unit 400 may be a microporous membrane and/or a porous body as to be used in a known secondary battery.

In addition, isolation unit 400 may be a porous membrane such as glass paper in which glass fibers are woven into a non-woven fabric.

In addition, isolation unit 400 may be a diaphragm having ion conductivity such as lithium ion conductivity. For example, isolation unit 400 may be an ion exchange resin membrane or a solid electrolyte membrane. The ion exchange resin membrane may be, for example, a cation exchange membrane and an anion exchange membrane.

Incidentally, flow battery 1000 according to the first embodiment may further include first circulation mechanism 510.

First circulation mechanism 510 is a mechanism which circulates first liquid 110 between first electrode 210 and first active material 310.

According to the above configuration, charge mediator 111 and discharge mediator 112 can be circulated together with first liquid 110 between first electrode 210 and first active material 310. This makes it possible to more efficiently perform the oxidation reaction and the reduction reaction between the respective materials.

First circulation mechanism 510 may be, for example, a mechanism including a pipe, a tank, a valve, and the like in addition to the magnetically driven pump.

Specific examples of first circulation mechanism 510 will be described later.

<Description of Charge and Discharge Process>

The charge and discharge process of flow battery 1000 according to the first embodiment will be described below.

Incidentally, the charge and discharge process will be specifically described while an operation example having the following configuration will be illustrated.

In other words, first electrode 210 is a negative electrode and is stainless steel in the present operation example.

In addition, first liquid 110 is an ether solution in which charge mediator 111 and discharge mediator 112 are dissolved in the present operation example.

In addition, charge mediator 111 is one kind of condensed aromatic compound (hereinafter referred to as ChMd) in the present operation example.

In addition, discharge mediator 112 is one kind of condensed aromatic compound (hereinafter referred to as DchMd) in the present operation example.

In addition, first active material 310 is graphite in the present operation example.

In addition, second electrode 220 is a positive electrode and includes a current collector (stainless steel) and lithium iron phosphate (LiFePO$_4$) which is an active material provided on the current collector in the present operation example.

[Description of Charge Process]

First, the charge reaction will be described.

Charge is performed as a voltage is applied to between first electrode 210 and second electrode 220.

(Reaction on Positive Electrode Side)

The application of voltage causes an oxidation reaction of the active material on the positive electrode side in second electrode 220 which is the positive electrode. In other words, lithium ions are released from the active material on the positive electrode side. By this, electrons are released from second electrode 220 to the outside of the flow battery.

For example, the following reaction takes place in the present operation example.

LiFePO$_4$→FePO$_4$+Li$^+$+$e^-$

Incidentally, a part of generated lithium ions (Li$^+$) may move to first liquid 110 through isolation unit 400.

(Reaction on Negative Electrode Side)

By the application of voltage, electrons are supplied from the outside of the flow battery to first electrode 210 which is the negative electrode. This causes a reduction reaction of charge mediator 111 and discharge mediator 112 on first electrode 210.

For example, the following reactions take place in the present operation example.

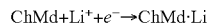
ChMd+Li$^+$+$e^-$→ChMd·Li

DchMd+Li$^+$+$e^-$→DchMd·Li

Charge mediator 111 reduced on first electrode 210 is moved to a place at which first active material 310 is provided by first circulation mechanism 510. In other words, charge mediator 111 reduced on first electrode 210 is supplied to the place at which first active material 310 is provided by first circulation mechanism 510.

At this time, charge mediator 111 reduced on first electrode 210 is oxidized by first active material 310. In other words, first active material 310 is reduced by charge mediator 111. By this, first active material 310 contains lithium and becomes C$_6$Li.

For example, the following reaction takes place in the present operation example.

6C+ChMd·Li→C$_6$Li+ChMd

Charge mediator 111 oxidized by first active material 310 is moved to a place at which first electrode 210 is provided by first circulation mechanism 510. In other words, charge mediator 111 oxidized by first active material 310 is supplied to the place at which first electrode 210 is provided by first circulation mechanism 510.

As described above, charge mediator 111 is not changed by the whole reaction including circulation.

Meanwhile, first active material 310 located at a place distant from first electrode 210 is in a charged state.

The above charge reaction may proceed until either of a state in which first active material 310 is fully charged or a state in which the active material on the positive electrode side is fully charged is achieved.

[Description of Discharge Process]

Next, the discharge reaction from full charge will be described.

In the fully charged state, first active material 310 and the active material on the positive electrode side are in a charged state.

In the discharge reaction, electric power is extracted from between first electrode 210 and second electrode 220.

(Reaction on Positive Electrode Side)

By the discharge of battery, electrons are supplied from the outside of the flow battery to second electrode 220 which is the positive electrode. This causes a reduction reaction of the active material on second electrode 220.

For example, the following reaction takes place in the present operation example.

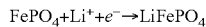
$$FePO_4 + Li^+ + e^- \rightarrow LiFePO_4$$

Incidentally, a part of lithium ions (Li$^+$) may be supplied from first liquid 110 through isolation unit 400.
(Reaction on Negative Electrode Side)

By the discharge of battery, an oxidation reaction of charge mediator 111 and discharge mediator 112 takes place on first electrode 210 which is the negative electrode. By this, electrons are released from first electrode 210 to the outside of the flow battery.

For example, the following reactions take place in the present operation example.

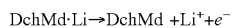
$$DchMd\cdot Li \rightarrow DchMd + Li^+ + e^-$$

$$ChMd\cdot Li \rightarrow ChMd + Li^+ + e^-$$

Discharge mediator 112 oxidized on first electrode 210 is moved to a place at which first active material 310 is provided by first circulation mechanism 510. In other words, discharge mediator 112 oxidized on first electrode 210 is supplied to the place at which first active material 310 is provided by first circulation mechanism 510.

At this time, discharge mediator 112 oxidized on first electrode 210 is reduced by first active material 310. In other words, first active material 310 is oxidized by discharge mediator 112. By this, first active material 310 releases lithium.

For example, the following reaction takes place in the present operation example.

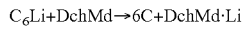
$$C_6Li + DchMd \rightarrow 6C + DchMd\cdot Li$$

Discharge mediator 112 reduced by first active material 310 is moved to a place at which first electrode 210 is provided by first circulation mechanism 510. In other words, discharge mediator 112 reduced by first active material 310 is supplied to the place at which first electrode 210 is provided by first circulation mechanism 510.

As described above, discharge mediator 112 is not changed by the whole reaction including circulation.

Meanwhile, first active material 310 located at a place distant from first electrode 210 is in a discharged state.

The above discharge reaction may proceed until either of a state in which first active material 310 is fully discharged or a state in which the active material on the positive electrode side is fully discharged is achieved.

Figure 2:
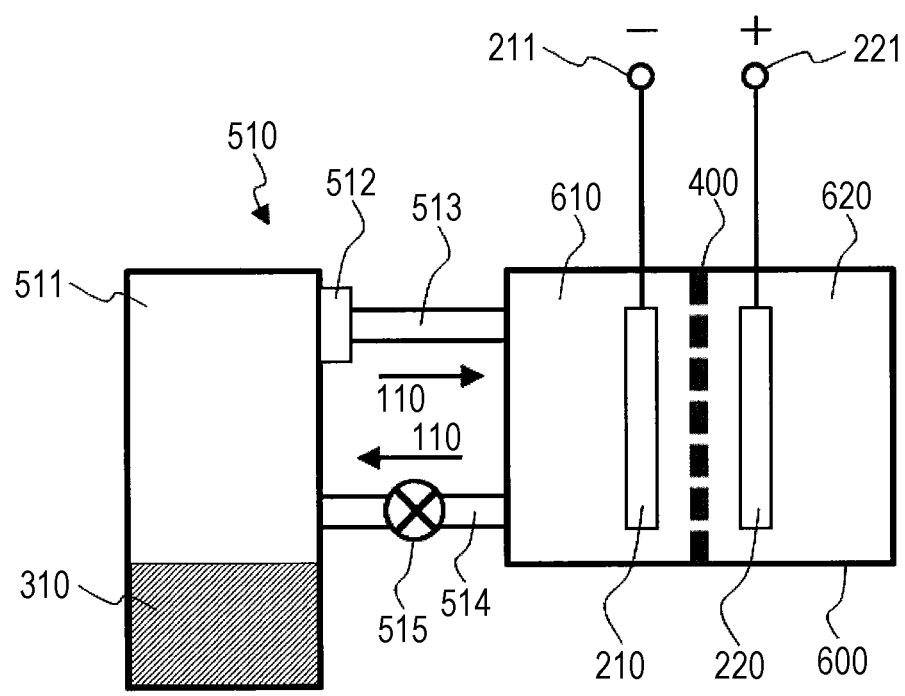
FIG. 2 is a schematic diagram of a flow battery according to a first embodiment.

FIG. 2 is a schematic diagram of flow battery 2000 according to the first embodiment.

Flow battery 2000 according to the first embodiment has the following configuration in addition to the configuration of flow battery 1000 described above.

In other words, in flow battery 2000 according to the first embodiment, first circulation mechanism 510 includes first chamber 511.

First active material 310 and first liquid 110 are contained in first chamber 511.

First circulation mechanism 510 circulates first liquid 110 between first electrode 210 and first chamber 511.

As first active material 310 and first liquid 110 come into contact with each other in first chamber 511, at least either of an oxidation reaction of charge mediator 111 by first active material 310 or a reduction reaction of discharge mediator 112 by first active material 310 takes place.

According to the above configuration, first liquid 110 and first active material 310 can be brought into contact with each other in first chamber 511. This makes it possible to further increase, for example, the contact area between first liquid 110 and first active material 310. In addition, the contact time between first liquid 110 and first active material 310 can be extended. For this reason, the oxidation reaction of charge mediator 111 by first active material 310 and the reduction reaction of discharge mediator 112 by first active material 310 can be more efficiently performed.

Incidentally, first chamber 511 may be, for example, a tank in the first embodiment.

In addition, first chamber 511 may contain, for example, first liquid 110 in which charge mediator 111 and discharge mediator 112 are dissolved in the gap between filled first active materials 310.

In addition, as illustrated in FIG. 2, flow battery 2000 according to the first embodiment may further include electrochemical reaction unit 600, positive electrode terminal 221, and negative electrode terminal 211.

The electrochemical reaction unit 600 is separated into negative electrode chamber 610 and positive electrode chamber 620 by isolation unit 400.

In negative electrode chamber 610, an electrode to be a negative electrode is disposed. In FIG. 2, first electrode 210 is disposed in negative electrode chamber 610.

Negative electrode terminal 211 is connected to the electrode to be a negative electrode.

In positive electrode chamber 620, an electrode to be a positive electrode is disposed. In FIG. 2, second electrode 220 is disposed in positive electrode chamber 620.

Positive electrode terminal 221 is connected to the electrode to be a positive electrode.

Negative electrode terminal 211 and positive electrode terminal 221 are connected to, for example, a charge and discharge device. By the charge and discharge device, a voltage is applied to between negative electrode terminal 211 and positive electrode terminal 221 or electric power is extracted from between negative electrode terminal 211 and positive electrode terminal 221.

In addition, in flow battery 2000 according to the first embodiment, first circulation mechanism 510 may include pipe 513, pipe 514, and magnetically driven pump 515 as illustrated in FIG. 2.

One end of pipe 513 is connected to the outlet of first liquid 110 in first chamber 511.

The other end of pipe 513 is connected to one in which first electrode 210 is disposed between negative electrode chamber 610 and positive electrode chamber 620. In FIG. 2, the other end of pipe 513 is connected to negative electrode chamber 610.

One end of pipe 514 is connected to one in which first electrode 210 is disposed between negative electrode chamber 610 and positive electrode chamber 620. In FIG. 2, one end of pipe 514 is connected to negative electrode chamber 610.

The other end of pipe 514 is connected to the inlet of first liquid 110 in first chamber 511.

Figure 5:
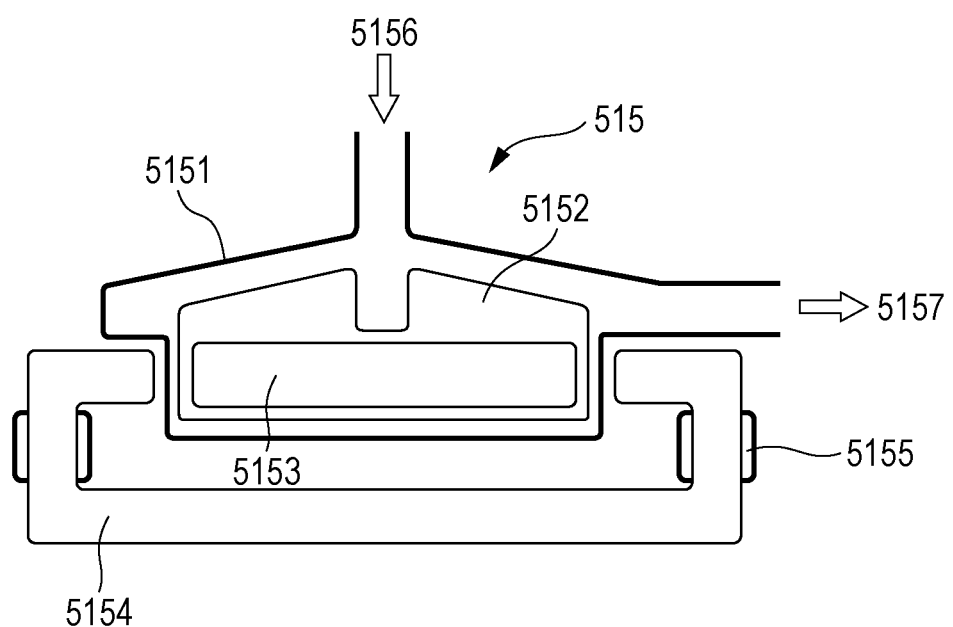
FIG. 5 is a partially enlarged diagram of a magnetically levitated pump included in a flow battery according to a first embodiment.

Magnetically driven pump 515 is provided, for example, in pipe 514. Alternatively, magnetically driven pump 515 may be provided in pipe 513. Magnetically driven pump 515 may be, for example, a magnetically levitated pump illustrated in FIG. 5. Magnetically driven pump 515 includes a motor. In FIG. 5, magnetically driven pump 515 includes casing 5151, impeller 5152, rotor magnet 5153, stator for motor and magnetic bearing 5154, and coil for motor and magnetic bearing 5155. Impeller 5152 has rotor magnet 5153 built-in. In FIG. 5, magnetically driven pump 515 includes impeller 5152 and rotor magnet 5153 inside casing 5151. In FIG. 5, the portion to be in contact with first liquid 110 corresponds to casing 5151 and impeller 5152. In FIG. 5, first liquid 110 is sucked from suction port 5156 and first liquid 110 is ejected from ejection port 5157. In magnetically driven pump 515, for example, casing 5151 may be composed of a resin nonreactive with first liquid 110 in which the mediator of the first redox material is dissolved. Magnetically driven pump 515 is driven by a magnet, and it is thus possible to rotate impeller 5152 in a sealed vessel. As a result, sealless driving of the magnetically driven pump is possible and liquid leakage can be prevented.

Incidentally, in flow battery 2000 according to the first embodiment, first circulation mechanism 510 may include first transmission suppressing unit 512.

First transmission suppressing unit 512 suppresses the transmission of first active material 310.

First transmission suppressing unit 512 is provided on a path through which first liquid 110 flows out from first chamber 511 to first electrode 210. In FIG. 2, first transmission suppressing unit 512 is provided in pipe 513.

According to the above configuration, it is possible to suppress the outflow of first active material 310 to places (for example, first electrode 210 side) other than first chamber 511. In other words, first active material 310 remains in first chamber 511. This makes it possible to realize a flow battery having a configuration in which first active material 310 itself is not circulated. For this reason, it is possible to prevent the inside of the members of first circulation mechanism 510 from clogging with first active material 310. The member of first circulation mechanism 510 may be, for example, a pipe. In addition, it is possible to suppress the occurrence of resistance loss due to outflow of first active material 310 to the first electrode 210 side.

First transmission suppressing unit 512 may be provided at, for example, the junction between first chamber 511 and pipe 513.

First transmission suppressing unit 512 may be, for example, a filter through which first active material 310 is filtered. At this time, the filter may be a member having pores smaller than the minimum particle size of the particles of first active material 310. As a material for the filter, a material which does not react with first active material 310, first liquid 110 and the like may be used. The filter may be, for example, glass fiber filter paper, a polypropylene non-woven fabric, a polyethylene non-woven fabric, and a metal mesh which does not react with metal lithium.

According to the above configuration, it is possible to prevent the outflow of first active material 310 from first chamber 511 even when the flow of first active material 310 occurs together with the flow of first liquid 110 inside first chamber 511.

In the example illustrated in FIG. 2, first liquid 110 contained in first chamber 511 passes through first transmission suppressing unit 512 and pipe 513 and is supplied to negative electrode chamber 610.

By this, charge mediator 111 and discharge mediator 112 dissolved in first liquid 110 are oxidized or reduced on first electrode 210.

Thereafter, first liquid 110 in which oxidized or reduced charge mediator 111 and discharge mediator 112 are dissolved passes through pipe 514 and magnetically driven pump 515 and is supplied to first chamber 511.

With regard to charge mediator 111 and discharge mediator 112 dissolved in first liquid 110, at least either of an oxidation reaction of charge mediator 111 by first active material 310 or a reduction reaction of discharge mediator 112 by first active material 310 is performed by this.

Incidentally, the circulation of first liquid 110 may be controlled by, for example, magnetically driven pump 515. In other words, magnetically driven pump 515 appropriately starts the supply of first liquid 110 or stops the supply or adjusts the supply amount and the like.

Incidentally, electrolytic solutions and/or solvents having different compositions may be respectively used on the negative electrode chamber 610 side and the positive electrode chamber 620 side by being partitioned by isolation unit 400.

In addition, electrolytic solutions and/or solvents having the same composition may be used on the positive electrode chamber 620 side and the negative electrode chamber 610 side.

Second Embodiment

A second embodiment will be described below. Incidentally, the description which overlaps with that of the first embodiment will be appropriately omitted.

As the second embodiment, a configuration in which the electrolytic solution is circulated on both the first electrode side and the second electrode side is described.

Figure 3:
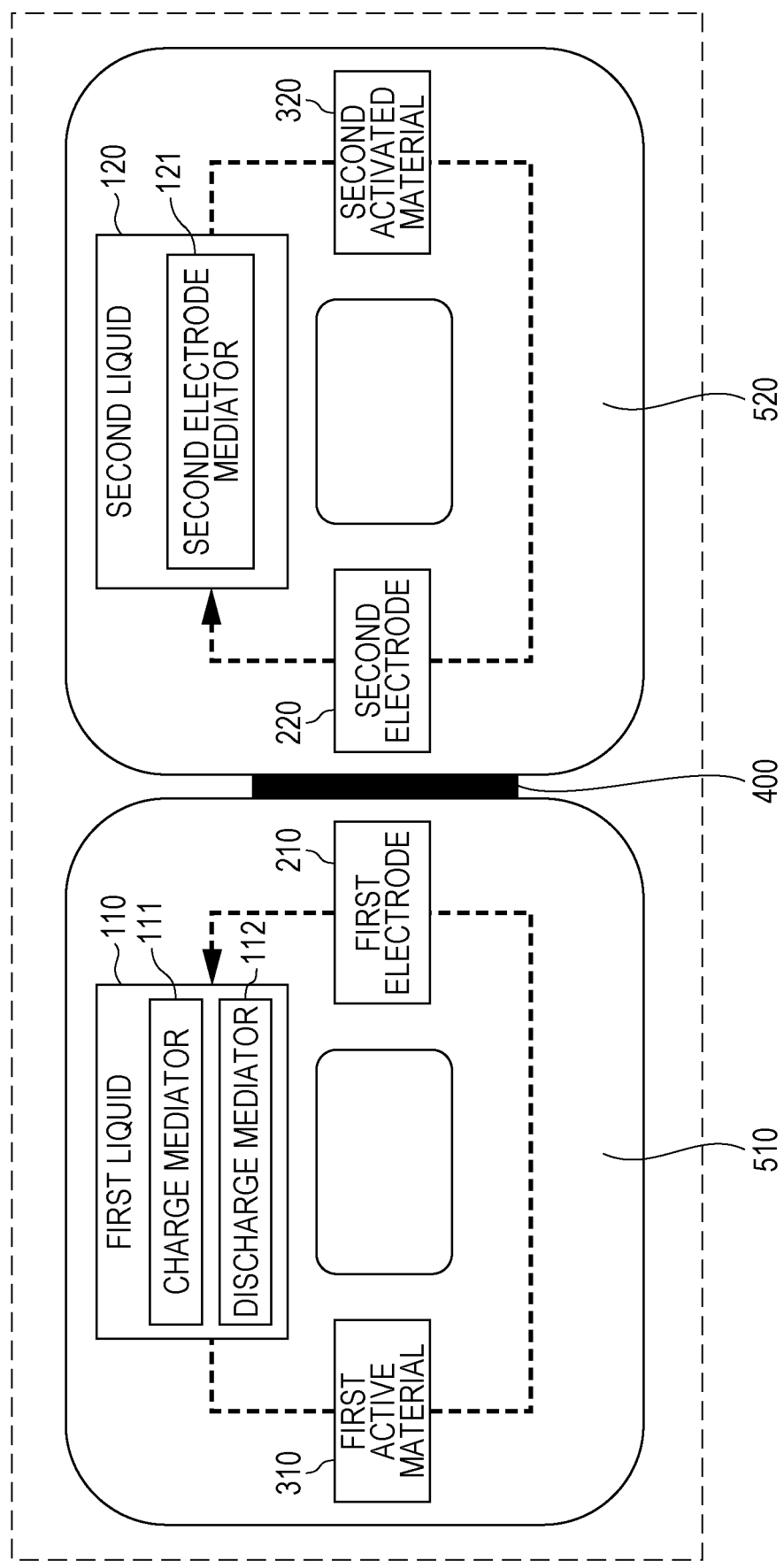
FIG. 3 is a block diagram of a flow battery according to a second embodiment.

FIG. 3 is a block diagram of flow battery 3000 according to the second embodiment.

Flow battery 3000 according to the second embodiment has the following configuration in addition to the configuration of flow battery 1000 according to the first embodiment described above.

In other words, flow battery 3000 according to the second embodiment further includes second liquid 120, second electrode 220, and second active material 320.

Second liquid 120 is a liquid in which a second redox material is dissolved. Second liquid 120 is a liquid in which second electrode mediator 121 is dissolved.

Second electrode 220 is a counter electrode of first electrode 210. Second electrode 220 is an electrode to be immersed in second liquid 120.

Second active material 320 is an active material to be immersed in second liquid 120.

Second electrode mediator 121 is oxidized or reduced by second electrode 220.

Second electrode mediator 121 is oxidized or reduced by second active material 320.

According to the above configuration, it is possible to realize a flow battery equipped with both a higher energy density and a longer cycle life.

In other words, according to the above configuration, it is possible to realize a flow battery having a configuration in which an active material itself is not circulated while the active material is utilized. For this reason, as second active material 320, for example, a powdery active material having a high capacity can be used in the charge and discharge reaction. This makes it possible to realize a higher energy density and a high capacity. In addition, the battery capacity is determined by "positive electrode capacity density×negative electrode capacity density/(positive electrode capacity density+negative electrode capacity density)". For this reason, it is possible to greatly improve the capacity density by using a mediator type flow battery structure on both the first electrode 210 side and the second electrode 220 side.

In addition, according to the above configuration, it is possible to circulate only second liquid 120 in which second electrode mediator 121 is dissolved without circulating the powdery active material itself. For this reason, it is possible to suppress the occurrence of clogging and the like of the pipe and the like by the powdery active material. Hence, it is possible to realize a flow battery having a longer cycle life.

In addition, according to the above configuration, it is possible to use a material having a relatively high equilibrium potential (V vs. Li/Li$^+$) as second electrode mediator 121 by using an active material having a relatively high equilibrium potential (V vs. Li/Li$^+$) as second active material 320. The active material having a relatively high equilibrium potential as second active material 320 is, for example, lithium iron phosphate. Examples of the material having a relatively high equilibrium potential as second electrode mediator 121 include tetrathiafulvalene. This makes it possible to realize a positive electrode of a flow battery having a higher potential. For this reason, it is possible to realize a flow battery having a higher battery voltage.

Incidentally, in flow battery 3000 according to the second embodiment, lithium may be dissolved in second liquid 120.

Second active material 320 may be a material having a property to contain and release lithium.

Furthermore, second electrode mediator 121 may be oxidized on second electrode 220 and second active material 320 may release lithium as well as second electrode mediator 121 oxidized on second electrode 220 may be reduced by second active material 320 at the time of charge of flow battery 3000. The time of charge of flow battery 3000 refers to a state in which electrons are released from second electrode 220 to the outside of flow battery 3000 as well as electrons are supplied from the outside of flow battery 3000 to first electrode 210.

Furthermore, second electrode mediator 121 may be reduced on second electrode 220 and second active material 320 may contain lithium as well as second electrode mediator 121 reduced on second electrode 220 may be oxidized by second active material 320 at the time of discharge of flow battery 3000. The time of discharge of flow battery 3000 refers to a state in which electrons are supplied from the outside of flow battery 3000 to second electrode 220 as well as electrons are released from first electrode 210 to the outside of flow battery 3000.

According to the above configuration, for example, an active material having a property to reversibly contain and release lithium and/or lithium ions can be used as second active material 320. This makes the material design of second active material 320 easier. Moreover, a higher capacity can be realized.

For example, as second liquid 120 comes into contact with second electrode 220, second electrode mediator 121 is oxidized or reduced on second electrode 220.

For example, as second liquid 120 comes into contact with second active material 320, second electrode mediator 121 is oxidized or reduced by second active material 320.

Incidentally, in flow battery 3000 according to the second embodiment, there may be an overlapping region in the redox potential region of second electrode mediator 121 and the redox potential region of second active material 320.

According to the above configuration, the oxidation and reduction of second electrode mediator 121 can be performed by second active material 320.

In addition, in flow battery 3000 according to the second embodiment, the upper limit value of the redox potential region of second electrode mediator 121 may be higher than the upper limit value of the redox potential region of second active material 320.

At this time, the lower limit value of the redox potential region of second electrode mediator 121 may be lower than the lower limit value of the redox potential region of second active material 320.

According to the above configuration, the capacity of second active material 320 can be sufficiently utilized. For example, the capacity of second active material 320 can be utilized approximately 100%. For this reason, it is possible to realize a flow battery having a higher capacity.

As second electrode mediator 121, one kind of redox species having a plurality of redox potentials may be used.

In addition, as second electrode mediator 121, a mixture of a plurality of redox species having certain redox potentials may be used.

In addition, in flow battery 3000 according to the second embodiment, second electrode mediator 121 may be an organic compound which has a property to be oxidized or reduced.

According to the above configuration, the solubility of second electrode mediator 121 in second liquid 120 can be increased. For example, the solubility of second electrode mediator 121 in non-aqueous solvent can be increased.

In addition, in flow battery 3000 according to the second embodiment, second electrode mediator 121 may be an organic compound which has multistage redox potentials (for example, two or more redox potentials).

Examples of such an organic compound capable of being oxidized or reduced in multistage include tetrathiafulvalene derivatives, quinone derivatives, and TCNQ which are organic compounds having a π-conjugated electron cloud.

Incidentally, in flow battery 3000 according to the second embodiment, second electrode mediator 121 may be tetrathiafulvalene.

According to the above configuration, it is possible to realize second electrode mediator 121 having relatively high two-stage redox potentials (about a lower limit value of 3.4 V and a upper limit value of 3.7 V as lithium standard potential). This makes it possible to realize a positive electrode of a flow battery having a higher potential. For this reason, it is possible to realize a flow battery having a high battery voltage.

In addition, in flow battery 3000 according to the second embodiment, second active material 320 may be a material having a property to reversibly contain and release lithium ions. For example, as second active material 320, a known active material for secondary battery may be used. The known active material for secondary battery may be, for example, a transition metal oxide, a fluoride, a polyanion, a fluorinated polyanion, and a transition metal sulfide.

Incidentally, in flow battery 3000 according to the second embodiment, second active material 320 may contain lithium iron phosphate.

According to the above configuration, the equilibrium potential (V vs. Li/Li$^+$) of second active material 320 can be set to be relatively high. For this reason, it is possible to use a material having a relatively high equilibrium potential (V vs. Li/Li$^+$) as second electrode mediator 121. Examples of the material having a relatively high equilibrium potential as second electrode mediator 121 include tetrathiafulvalene. This makes it possible to realize a positive electrode of a flow battery having a higher potential. For this reason, it is possible to realize a flow battery having a high battery voltage.

Compounds containing iron or manganese or lithium, vanadium-containing compounds and the like have redox potentials of 3.2 V to 3.7 V based on lithium. The compound containing iron or manganese or lithium may be, for example, $LiFePO_4$ and $LiMnO_2$. The vanadium-containing compound may be, for example, $V_2O_5$. For this reason, in the case of using $LiFePO_4$ or the like as second active material 320, tetrathiafulvalene may be used as second electrode mediator 121.

Incidentally, in flow battery 3000 according to the second embodiment, second electrode mediator 121 may be a quinone derivative. A quinone derivative has, for example, multistage redox potentials at 1 V to 3 V based on lithium. In this case, a material having a redox potential at 1 V to 3 V based on lithium may be used as second active material 320. Examples of the material having a redox potential at 1 V to 3 V based on lithium include compounds containing titanium or niobium or lithium. The compound containing titanium or niobium or lithium may be, for example, $Li_4Ti_5O_{12}$ and $LiNbO_3$.

In addition, in flow battery 3000 according to the second embodiment, second electrode mediator 121 may be a metal-containing ion. Examples of the metal-containing ion include a vanadium ion, a manganese ion, and a molybdenum ion which have multistage redox potentials. For example, a vanadium ion has wide reaction stages (divalent and trivalent, trivalent and tetravalent, and tetravalent and pentavalent).

Incidentally, a powdery active material may be used as second active material 320. In a case in which second active material 320 is filled into the tank in a powder state without being processed, the manufacture can be simplified and the manufacturing cost can be reduced.

In addition, a pellet-shaped active material may be used as second active material 320. The pellet-shaped active material may be, for example, an active material in a state in which a powder is pelletized. In a case in which second active material 320 is filled into the tank in a pellet shape, the manufacture can be simplified and the manufacturing cost can be reduced.

In addition, an active material solidified into a pellet shape using a known binder may be used as second active material 320. Examples of the binder include polyvinylidene fluoride, polypropylene, polyethylene, and polyimide.

In addition, as second active material 320, an active material in a state of being immobilized in a membrane shape on a metal foil may be used.

In addition, an active material in which a known auxiliary conductive agent or ion conductor is mixed may be used as second active material 320. Examples of the known auxiliary conductive agent include carbon black and polyaniline. Examples of the ion conductor include polymethyl methacrylate and polyethylene oxide.

Incidentally, second active material 320 may be a material insoluble in second liquid 120. This makes it possible to realize a flow battery having a configuration in which second electrode mediator 121 is circulated together with second liquid 120 but second active material 320 is not circulated.

Second liquid 120 may be, for example, a known non-aqueous electrolytic solution for secondary battery. At this time, the non-aqueous electrolytic solution consists of, for example, a known electrolyte salt and a non-aqueous solvent in which the electrolyte salt is dissolved. Examples of the known electrolyte salt include electrolyte salts of lithium ions with anions.

As the non-aqueous solvent, known non-aqueous solvents for secondary battery may be used. In other words, as the non-aqueous solvent, cyclic and linear carbonates, cyclic and linear esters, cyclic and linear ethers, nitriles, cyclic and linear sulfones, cyclic and linear sulfoxides, and the like may be used.

Incidentally, different solvents or the same solvent may be used in first liquid 110 and second liquid 120.

Incidentally, in flow battery 3000 according to the second embodiment, first electrode 210 may be a negative electrode and second electrode 220 may be a positive electrode.

Incidentally, if an electrode having a relatively low potential is used as second electrode 220, first electrode 210 may also be a positive electrode.

In other words, first electrode 210 may be a positive electrode and second electrode 220 may be a negative electrode.

Second electrode 220 may be an electrode having a surface which acts as a reaction site of second electrode mediator 121.

In this case, a material which is stable with respect to the solvent and supporting electrolyte of second liquid 120 may be used as second electrode 220. The material stable with respect to second liquid 120 may be a material which is insoluble in second liquid 120. Furthermore, a material which is stable with respect to an electrochemical reaction of an electrode reaction may be used as second electrode 220. For example, a metal and carbon may be used as second electrode 220. The metal may be, for example, stainless steel, iron, copper, and nickel.

Second electrode 220 may be one having a structure of which the surface area is increased. The one having a structure of which the surface area is increased may be, for example, a mesh, a non-woven fabric, a surface-roughened plate, and a sintered porous body. According to this, the specific surface area of second electrode 220 is increased. This makes it possible to more easily progress the oxidation reaction or reduction reaction of second electrode mediator 121.

Incidentally, electrodes fabricated using different materials or electrodes fabricated using the same material may be used as first electrode 210 and second electrode 220.

Incidentally, flow battery 3000 according to the second embodiment may further include isolation unit 400.

Isolation unit 400 isolates first electrode 210 and first liquid 110 from second electrode 220 and second liquid 120.

As isolation unit 400, the isolation unit described in the first embodiment may be used.

Incidentally, flow battery 3000 according to the second embodiment may further include second circulation mechanism 520.

Second circulation mechanism 520 is a mechanism which circulates second liquid 120 between second electrode 220 and second active material 320.

According to the above configuration, second electrode mediator 121 can be circulated together with second liquid 120 between second electrode 220 and second active material 320. This makes it possible to more efficiently perform the oxidation reaction and the reduction reaction between the respective materials.

Second circulation mechanism 520 may be, for example, a mechanism including a pipe, a tank, a pump, a valve, and the like. The pump may be a magnetically driven pump of which the portion to be in contact with second liquid 120 is composed of a resin nonreactive with lithium. The pump may be composed of, for example, Teflon (registered trademark) resin.

A specific example of second circulation mechanism 520 is described in the third embodiment later.

<Description of Charge and Discharge Process>

The charge and discharge process of flow battery 3000 according to the second embodiment will be described below.

Incidentally, the charge and discharge process will be specifically described while an operation example having the following configuration will be illustrated.

In other words, first electrode 210 is a negative electrode and is stainless steel in the present operation example.

In addition, first liquid 110 is an ether solution in which charge mediator 111 and discharge mediator 112 are dissolved in the present operation example.

In addition, charge mediator 111 is one kind of condensed aromatic compound (hereinafter referred to as ChMd) in the present operation example.

In addition, discharge mediator 112 is one kind of condensed aromatic compound (hereinafter referred to as DchMd) in the present operation example.

In addition, first active material 310 is graphite in the present operation example.

In addition, second electrode 220 is a positive electrode and is stainless steel in the present operation example.

In addition, second liquid 120 is an ether solution in which second electrode mediator 121 is dissolved in the present operation example.

In addition, second electrode mediator 121 is tetrathiafulvalene (hereinafter referred to as TTF) in the present operation example.

In addition, second active material 320 is lithium iron phosphate (LiFePO$_4$) in the present operation example.

In addition, isolation unit 400 is a solid electrolyte membrane having lithium ion conductivity in the present operation example.

[Description of Charge Process]

First, the charge reaction will be described.

Charge is performed as a voltage is applied to between first electrode 210 and second electrode 220.

(Reaction on Positive Electrode Side)

The application of voltage causes an oxidation reaction of second electrode mediator 121 in second electrode 220 which is the positive electrode. In other words, second electrode mediator 121 is oxidized on the surface of second electrode 220. By this, electrons are released from second electrode 220 to the outside of the flow battery.

For example, the following reactions take place in the present operation example.

$$TTF \rightarrow TTF^+ + e^-$$

$$TTF^+ \rightarrow TTF^{2+} + e^-$$

Second electrode mediator 121 oxidized on second electrode 220 is moved to a place at which second active material 320 is provided by second circulation mechanism 520. In other words, second electrode mediator 121 oxidized on second electrode 220 is supplied to the place at which second active material 320 is provided by second circulation mechanism 520.

At this time, second electrode mediator 121 oxidized on second electrode 220 is reduced by second active material 320. In other words, second active material 320 is oxidized by second electrode mediator 121. By this, second active material 320 releases lithium.

For example, the following reaction takes place in the present operation example.

$$LiFePO_4 + TTF^{2+} \rightarrow FePO_4 + Li^+ + TTF^+$$

Second electrode mediator 121 reduced by second active material 320 is moved to a place at which second electrode 220 is provided by second circulation mechanism 520. In other words, second electrode mediator 121 reduced by second active material 320 is supplied to the place at which second electrode 220 is provided by second circulation mechanism 520.

At this time, second electrode mediator 121 is oxidized on the surface of second electrode 220.

For example, the following reaction takes place in the present operation example.

$$TTF^+ \rightarrow TTF^{2+} + e^-$$

Incidentally, a part of generated lithium ions (Li$^+$) may move to first liquid 110 through isolation unit 400.

As described above, second electrode mediator 121 is not changed by the whole reaction including circulation.

Meanwhile, second active material 320 located at a place distant from second electrode 220 is in a charged state.

As described above, TTF$^{2+}$ is a charge mediator on the second electrode 220 side.

In the fully charged state, TTF$^{2+}$ is present in second liquid 120 and second active material 320 becomes FePO$_4$. At this time, the charge potential is determined by the oxidation potential into TTF$^{2+}$.

(Reaction on Negative Electrode Side)

By the application of voltage, electrons are supplied from the outside of the flow battery to first electrode 210 which is the negative electrode. This causes a reduction reaction of charge mediator 111 and discharge mediator 112 on first electrode 210.

For example, the following reactions take place in the present operation example.

$$ChMd + Li^+ + e^- \rightarrow ChMd \cdot Li$$

$$DchMd + Li^+ + e^- \rightarrow DchMd \cdot Li$$

Charge mediator 111 reduced on first electrode 210 is moved to a place at which first active material 310 is provided by first circulation mechanism 510. In other words, charge mediator 111 reduced on first electrode 210 is supplied to the place at which first active material 310 is provided by first circulation mechanism 510.

At this time, charge mediator 111 reduced on first electrode 210 is oxidized by first active material 310. In other words, first active material 310 is reduced by charge mediator 111. By this, first active material 310 contains lithium and becomes C$_6$Li.

For example, the following reaction takes place in the present operation example.

$$6C + ChMd \cdot Li \rightarrow C_6Li + ChMd$$

Charge mediator 111 oxidized by first active material 310 is moved to a place at which first electrode 210 is provided by first circulation mechanism 510. In other words, charge mediator 111 oxidized by first active material 310 is supplied to the place at which first electrode 210 is provided by first circulation mechanism 510.

As described above, charge mediator 111 is not changed by the whole reaction including circulation.

Meanwhile, first active material 310 located at a place distant from first electrode 210 is in a charged state.

The above charge reaction may proceed until either of a state in which first active material 310 is fully charged or a state in which second active material 320 is fully charged is achieved.

[Description of Discharge Process]

Next, the discharge reaction from full charge will be described.

In the fully charged state, first active material 310 and second active material 320 are in a charged state.

In the discharge reaction, electric power is extracted from between first electrode 210 and second electrode 220.

(Reaction on Positive Electrode Side)

By the discharge of battery, electrons are supplied from the outside of the flow battery to second electrode 220 which is the positive electrode. This causes a reduction reaction of second electrode mediator 121 on second electrode 220. In other words, second electrode mediator 121 is reduced on the surface of second electrode 220.

For example, the following reactions take place in the present operation example.

$$TTF^{2+}+e^-\rightarrow TTF^+$$

$$TTF^++e^-\rightarrow TTF$$

Second electrode mediator 121 reduced on second electrode 220 is moved to a place at which second active material 320 is provided by second circulation mechanism 520. In other words, second electrode mediator 121 reduced on second electrode 220 is supplied to the place at which second active material 320 is provided by second circulation mechanism 520.

At this time, second electrode mediator 121 reduced on second electrode 220 is oxidized by second active material 320. In other words, second active material 320 is reduced by second electrode mediator 121. By this, second active material 320 contains lithium.

For example, the following reaction takes place in the present operation example.

$$FePO_4+Li^++TTF\rightarrow LiFePO_4+TTF^+$$

Second electrode mediator 121 oxidized by second active material 320 is moved to a place at which second electrode 220 is provided by second circulation mechanism 520. In other words, second electrode mediator 121 oxidized by second active material 320 is supplied to the place at which second electrode 220 is provided by second circulation mechanism 520.

At this time, second electrode mediator 121 is reduced on the surface of second electrode 220.

For example, the following reaction takes place in the present operation example.

$$TTF^++e^-\rightarrow TTF$$

Incidentally, a part of lithium ions (Li$^+$) may be supplied from first liquid 110 through isolation unit 400.

As described above, second electrode mediator 121 is not changed by the whole reaction including circulation.

Meanwhile, second active material 320 located at a place distant from second electrode 220 is in a discharged state.

As described above, TTF is a discharge mediator on the second electrode 220 side.

In the fully discharged state, TTF is present in second liquid 120 and second active material 320 becomes LiFePO$_4$. At this time, the discharge potential is determined by the reduction potential into TTF.

(Reaction on Negative Electrode Side)

By the discharge of battery, an oxidation reaction of charge mediator 111 and discharge mediator 112 takes place on first electrode 210 which is the negative electrode. By this, electrons are released from first electrode 210 to the outside of the flow battery.

For example, the following reactions take place in the present operation example.

$$DchMd\cdot Li\rightarrow DchMd+Li^++e^-$$

$$ChMd\cdot Li\rightarrow ChMd+Li^++e^-$$

Discharge mediator 112 oxidized on first electrode 210 is moved to a place at which first active material 310 is provided by first circulation mechanism 510. In other words, discharge mediator 112 oxidized on first electrode 210 is supplied to the place at which first active material 310 is provided by first circulation mechanism 510.

At this time, discharge mediator 112 oxidized on first electrode 210 is reduced by first active material 310. In other words, first active material 310 is oxidized by discharge mediator 112. By this, first active material 310 releases lithium.

For example, the following reaction takes place in the present operation example.

$$C_6Li+DchMd\rightarrow 6C+DchMd\cdot Li$$

Discharge mediator 112 reduced by first active material 310 is moved to a place at which first electrode 210 is provided by first circulation mechanism 510. In other words, discharge mediator 112 reduced by first active material 310 is supplied to the place at which first electrode 210 is provided by first circulation mechanism 510.

As described above, discharge mediator 112 is not changed by the whole reaction including circulation.

Meanwhile, first active material 310 located at a place distant from first electrode 210 is in a discharged state.

The above discharge reaction may proceed until either of a state in which first active material 310 is fully discharged or a state in which second active material 320 is fully discharged is achieved.

<Estimation of Energy Density>

The estimation results on the energy density of flow battery 3000 according to the second embodiment will be described below.

The estimation results on the energy density of flow battery 3000 according to the second embodiment are presented in from Table 7 to Table 13. In these tables, the potentials (V vs. Li/Li$^+$) of the respective mediators, the charge and discharge voltages (V) of flow battery, the theoretical capacity density (Ah/L) of flow battery, the theoretical energy density (Wh/L) of flow battery, the volume filling factor of power generating element, and the energy density (Wh/L) of flow battery are presented.

TABLE 7

(Negative electrode active material: graphite)

| | Negative electrode charge mediator | | | |
|---|---|---|---|---|
| | Biphenyl | | Phenanthrene | |
| Negative electrode discharge mediator | 2,2'-Bipyridyl | trans-Stilbene | 2,2'-Bipyridyl | trans-Stilbene |
| Positive electrode charge mediator (TTF+) potential | 3.7 | 3.7 | 3.7 | 3.7 |
| Positive electrode discharge mediator (TTF) potential | 3.4 | 3.4 | 3.4 | 3.4 |
| Negative electrode charge mediator potential | 0 | 0 | 0.03 | 0.03 |
| Negative electrode discharge mediator potential | 0.4 | 0.3 | 0.4 | 0.3 |
| Flow battery charge voltage | 3.7 | 3.7 | 3.67 | 3.67 |
| Flow battery discharge voltage | 3 | 3.1 | 3 | 3.1 |
| Flow battery theoretical capacity density | 317 | 317 | 317 | 317 |
| Flow battery theoretical energy density | 951 | 983 | 951 | 983 |
| Power generating element volume filling factor | 0.6 | 0.6 | 0.6 | 0.6 |
| Flow battery energy density | 571 | 590 | 571 | 590 |

TABLE 8

Case of using phenanthrene as negative electrode charge
(Negative electrode active mediator material: graphite)

| Negative electrode discharge mediator | 4,4'-Bipyridyl | 2,4'-Bipyridyl | 2,3'-Bipyridyl | cis-Stilbene | Acetophenone | Propiophenone | Butyrophenone | Valerophenone | Ethylene diamine |
|---|---|---|---|---|---|---|---|---|---|
| Positive electrode charge mediator (TTF+) potential | 3.7 | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 | 3.4 |
| Negative electrode charge mediator potential | 0.03 | 0.03 | 0.03 | 0.03 | 0.03 | 0.03 | 0.03 | 0.03 | 0.03 |
| Negative electrode discharge mediator potential | 1.22 | 0.54 | 0.58 | 0.43 | 1.29 | 0.42 | 0.3 | 0.31 | 0.36 |
| Flow battery charge voltage | 3.67 | 3.67 | 3.67 | 3.67 | 3.67 | 3.67 | 3.67 | 3.67 | 3.67 |
| Flow battery discharge voltage | 2.18 | 2.86 | 2.82 | 2.97 | 2.11 | 2.98 | 3.1 | 3.09 | 3.04 |
| Flow battery theoretical capacity density | 317 | 318 | 319 | 320 | 321 | 322 | 323 | 324 | 325 |
| Flow battery theoretical energy density | 691.06 | 909.48 | 899.58 | 950.4 | 677.31 | 959.56 | 1001.3 | 1001.16 | 988 |
| Power generating element volume filling factor | 0.6 | 0.6 | 0.6 | 0.6 | 0.6 | 0.6 | 0.6 | 0.6 | 0.6 |
| Flow battery energy density | 414.636 | 545.688 | 539.748 | 570.24 | 406.386 | 575.736 | 600.78 | 600.696 | 592.8 |

Case of using biphenyl as negative electrode charge
(Negative electrode active mediator material: graphite)

| Negative electrode discharge mediator | 4,4'-Bipyridyl | 2,4'-Bipyridyl | 2,3'-Bipyridyl | cis-Stilbene | Acetophenone | Propiophenone | Butyrophenone | Valerophenone | Ethylene diamine |
|---|---|---|---|---|---|---|---|---|---|
| Positive electrode charge mediator (TTF+) potential | 3.7 | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 | 3.4 |
| Negative electrode charge mediator potential | 0 | 0 | 0 | 0 | 0 | 0 | 0 | 0 | 0 |
| Negative electrode discharge mediator potential | 1.22 | 0.54 | 0.58 | 0.43 | 1.29 | 0.42 | 0.3 | 0.31 | 0.36 |
| Flow battery charge voltage | 3.7 | 3.7 | 3.7 | 3.7 | 3.7 | 3.7 | 3.7 | 3.7 | 3.7 |
| Flow battery discharge voltage | 2.18 | 2.86 | 2.82 | 2.97 | 2.11 | 2.98 | 3.1 | 3.09 | 3.04 |
| Flow battery theoretical capacity density | 317 | 318 | 319 | 320 | 321 | 322 | 323 | 324 | 325 |
| Flow battery theoretical energy density | 691.06 | 909.48 | 899.58 | 950.4 | 677.31 | 959.56 | 1001.3 | 1001.16 | 988 |
| Power generating element volume filling factor | 0.6 | 0.6 | 0.6 | 0.6 | 0.6 | 0.6 | 0.6 | 0.6 | 0.6 |
| Flow battery energy density | 414.636 | 545.688 | 539.748 | 570.24 | 406.386 | 575.736 | 600.78 | 600.696 | 592.8 |

TABLE 9

Case of using triphenylene as negative electrode charge
(Negative electrode active mediator material: graphite)

| Negative electrode discharge mediator | 4,4'-Bipyridyl | 2,4'-Bipyridyl | 2,3'-Bipyridyl | cis-Stilbene | Acetophenone | Propiophenone | Butyrophenone | Valerophenone | Ethylene diamine |
|---|---|---|---|---|---|---|---|---|---|
| Positive electrode charge mediator (TTF+) potential | 3.7 | 3.7 | 3.7 | 3.7 | 3.7 | 3.7 | 3.7 | 3.7 | 3.7 |

TABLE 9-continued

| | | | | | | | | | |
|---|---|---|---|---|---|---|---|---|---|
| Positive electrode discharge mediator (TTF) potential | 3.4 | 3.4 | 3.4 | 3.4 | 3.4 | 3.4 | 3.4 | 3.4 | 3.4 |
| Negative electrode charge mediator Potential | 0.01 | 0.01 | 0.01 | 0.01 | 0.01 | 0.01 | 0.01 | 0.01 | 0.01 |
| Negative electrode discharge mediator potential | 1.22 | 0.54 | 0.58 | 0.43 | 1.29 | 0.42 | 0.3 | 0.31 | 0.36 |
| Flow battery charge voltage | 3.69 | 3.69 | 3.69 | 3.69 | 3.69 | 3.69 | 3.69 | 3.69 | 3.69 |
| Flow battery discharge voltage | 2.18 | 2.86 | 2.82 | 2.97 | 2.11 | 2.98 | 3.1 | 3.09 | 3.04 |
| Flow battery theoretical capacity density | 317 | 318 | 319 | 320 | 321 | 322 | 323 | 324 | 325 |
| Flow battery theoretical energy density | 691.06 | 909.48 | 899.58 | 950.4 | 677.31 | 959.56 | 1001.3 | 1001.16 | 988 |
| Power generating element volume filling factor | 0.6 | 0.6 | 0.6 | 0.6 | 0.6 | 0.6 | 0.6 | 0.6 | 0.6 |
| Flow battery energy density | 414.636 | 545.688 | 539.748 | 570.24 | 406.386 | 575.736 | 600.78 | 600.696 | 592.8 |

| Case of using anthracene as negative electrode charge (Negative electrode active mediator material: graphite) | | | | | | | | | |
|---|---|---|---|---|---|---|---|---|---|
| Negative electrode discharge mediator | 4,4'-Bipyridyl | 2,4'-Bipyridyl | 2,3'-Bipyridyl | cis-Stilbene | Acetophenone | Propiophenone | Butyrophenone | Valerophenone | Ethylene diamine |
| Positive electrode charge mediator (TTF+) potential | 3.7 | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 | 3.4 |
| Negative electrode charge mediator Potential | 0.05 | 0.05 | 0.05 | 0.05 | 0.05 | 0.05 | 0.05 | 0.05 | 0.05 |
| Negative electrode discharge mediator potential | 1.22 | 0.54 | 0.58 | 0.43 | 1.29 | 0.42 | 0.3 | 0.31 | 0.36 |
| Flow battery charge voltage | 3.65 | 3.65 | 3.65 | 3.65 | 3.65 | 3.65 | 3.65 | 3.65 | 3.65 |
| Flow battery discharge voltage | 2.18 | 2.86 | 2.82 | 2.97 | 2.11 | 2.98 | 3.1 | 3.09 | 3.04 |
| Flow battery theoretical capacity density | 317 | 318 | 319 | 320 | 321 | 322 | 323 | 324 | 325 |
| Flow battery theoretical energy density | 691.06 | 909.48 | 899.58 | 950.4 | 677.31 | 959.56 | 1001.3 | 1001.16 | 988 |
| Power generating element volume filling factor | 0.6 | 0.6 | 0.6 | 0.6 | 0.6 | 0.6 | 0.6 | 0.6 | 0.6 |
| Flow battery energy density | 414.636 | 545.688 | 539.748 | 570.24 | 406.386 | 575.736 | 600.78 | 600.696 | 592.8 |

TABLE 10

| Case of using phenanthrene as negative electrode charge mediator (Negative electrode active material: graphite) | | | | | | | |
|---|---|---|---|---|---|---|---|
| Negative electrode discharge mediator | 2,2'-Bipyridyl | trans-Stilbene | 4,4'-Bipyridyl | 2,4'-Bipyridyl | 2,3'-Bipyridyl | cis-Stilbene | Acetophenone | Propiophenone |
| Positive electrode charge mediator (TTF+) potential | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 |
| Negative electrode charge mediator potential | 0.03 | 0.03 | 0.03 | 0.03 | 0.03 | 0.03 | 0.03 | 0.03 |
| Negative electrode discharge mediator potential | 0.4 | 0.3 | 1.22 | 0.54 | 0.58 | 0.43 | 1.29 | 0.42 |

TABLE 10-continued

| | | | | | | | | |
|---|---|---|---|---|---|---|---|---|
| Flow battery charge voltage | 3.67 | 3.67 | 3.67 | 3.67 | 3.67 | 3.67 | 3.67 | 3.67 |
| Flow battery discharge voltage | 3 | 3.1 | 2.18 | 2.86 | 2.82 | 2.97 | 2.11 | 2.98 |
| Flow battery theoretical capacity density | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 |
| Power generating element volume filling factor | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 |

| | | | | | | |
|---|---|---|---|---|---|---|
| Negative electrode discharge mediator | Butyrophenone | Valerophenone | Ethylene-diamine | Benzil | Tetraphenyl-cyclopentadienone | Benzophenone |
| Positive electrode charge mediator (TTF+) potential | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 |
| Negative electrode charge mediator potential | 0.03 | 0.03 | 0.03 | 0.03 | 0.03 | 0.03 |
| Negative electrode discharge mediator potential | 0.3 | 0.31 | 0.36 | 0.16 | 0.34 | 0.78 |
| Flow battery charge voltage | 3.67 | 3.67 | 3.67 | 3.67 | 3.67 | 3.67 |
| Flow battery discharge voltage | 3.1 | 3.09 | 3.04 | 3.24 | 3.06 | 2.62 |
| Flow battery theoretical capacity density | 317 | 317 | 317 | 317 | 317 | 317 |
| Flow battery theoretical energy density | 982.7 | 979.53 | 963.68 | 1027.08 | 970.02 | 830.54 |
| Power generating element volume filling factor | 0.6 | 0.6 | 0.6 | 0.6 | 0.6 | 0.6 |
| Flow battery energy density | 589.62 | 587.718 | 578.208 | 616.248 | 582.012 | 498.324 |

Case of using biphenyl as negative electrode charge mediator
(Negative electrode active material: graphite)

| | | | | | | | | |
|---|---|---|---|---|---|---|---|---|
| Negative electrode discharge mediator | 2,2'-Bipyridyl | Trans-Stilbene | 4,4'-Bipyridyl | 2,4'-Bipyridyl | 2,3'-Bipyridyl | cis-Stilbene | Acetophenone | Propiophenone |
| Positive electrode charge mediator (TTF+) potential | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 |
| Negative electrode charge mediator potential | 0 | 0 | 0 | 0 | 0 | 0 | 0 | 0 |
| Negative electrode discharge mediator potential | 0.4 | 0.3 | 1.22 | 0.54 | 0.58 | 0.43 | 1.29 | 0.42 |
| Flow battery charge voltage | 3.7 | 3.7 | 3.7 | 3.7 | 3.7 | 3.7 | 3.7 | 3.7 |
| Flow battery discharge voltage | 3 | 3.1 | 2.18 | 2.86 | 2.82 | 2.97 | 2.11 | 2.98 |
| Flow battery theoretical capacity density | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 |
| Power generating element volume filling factor | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 |

TABLE 10-continued

| Negative electrode discharge mediator | Butyrophenone | Valerophenone | Ethylene-diamine | Benzil | Tetraphenyl-Cyclo-pentadienone | Benzophenone |
|---|---|---|---|---|---|---|
| Positive electrode charge mediator (TTF+) potential | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 |
| Negative electrode charge mediator potential | 0 | 0 | 0 | 0 | 0 | 0 |
| Negative electrode discharge mediator potential | 0.3 | 0.31 | 0.36 | 0.16 | 034 | 0.78 |
| Flow battery charge voltage | 3.7 | 3.7 | 3.7 | 3.7 | 3.7 | 37 |
| Flow battery discharge voltage | 3.1 | 3.09 | 3.04 | 3.24 | 3.06 | 262 |
| Flow battery theoretical capacity density | 317 | 317 | 317 | 317 | 317 | 317 |
| Flow battery theoretical energy density | 982.7 | 979.53 | 963.68 | 1027.08 | 970.02 | 830.54 |
| Power generating element volume filling factor | 0.6 | 0.6 | 0.6 | 0.6 | 0.6 | 0.6 |
| Flow battery energy density | 589.62 | 587.718 | 578.208 | 616.248 | 582.012 | 498.324 |

TABLE 11

Case of using triphenylene as negative electrode charge mediator
(Negative electrode active material: graphite)

| Negative electrode discharge mediator | 2,2'-Bipyridyl | trans-Stilbene | 4,4'-Bipyridyl | 2,4'-Bipyridyl | 2.3'-Bipyridyl | cis-Stilbene | Acetophenone | Propiophenone |
|---|---|---|---|---|---|---|---|---|
| Positive electrode charge mediator (TTF+) potential | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 |
| Negative electrode charge mediator potential | 0.01 | 0.01 | 0.01 | 0.01 | 0.01 | 0.01 | 0.01 | 0.01 |
| Negative electrode discharge mediator potential | 0.4 | 0.3 | 1.22 | 0.54 | 0.58 | 0.43 | 1.29 | 0.42 |
| Flow battery charge voltage | 3.69 | 3.69 | 3.69 | 3.69 | 3.69 | 3.69 | 3.69 | 3.69 |
| Flow battery discharge voltage | 3 | 3.1 | 2.18 | 2.86 | 2.82 | 2.97 | 2.11 | 2.98 |
| Flow battery theoretical capacity density | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 |
| Power generating element volume filling factor | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 |

| Negative electrode discharge mediator | Butyrophenone | Valerophenone | Ethylene-diamine | Benzil | Tetraphenyl-cyclo-pentadienone | Benzophenone |
|---|---|---|---|---|---|---|
| Positive electrode charge mediator (TTF+) potential | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 |
| Negative electrode charge mediator potential | 0.01 | 0.01 | 0.01 | 0.01 | 0.01 | 0.01 |

TABLE 11-continued

| | | | | | | |
|---|---|---|---|---|---|---|
| Negative electrode discharge mediator potential | 0.3 | 0.31 | 0.36 | 0.16 | 0.34 | 0.78 |
| Flow battery charge voltage | 3.69 | 3.69 | 3.69 | 3.69 | 3.69 | 3.69 |
| Flow battery discharge voltage | 3.1 | 3.09 | 3.04 | 3.24 | 3.06 | 2.62 |
| Flow battery theoretical capacity density | 317 | 317 | 317 | 317 | 317 | 317 |
| Flow battery theoretical energy density | 982.7 | 979.53 | 963.68 | 1027.08 | 970.02 | 830.54 |
| Power generating element volume filling factor | 0.6 | 0.6 | 0.6 | 0.6 | 0.6 | 0.6 |
| Flow battery energy density | 589.62 | 587.718 | 578.208 | 616.248 | 582.012 | 498.324 |

Case of using o-terphenyl as negative electrode charge mediator
(Negative active electrode material: graphite)

| Negative electrode discharge mediator | 2,2'-Bipyridyl | trans-Stilbene | 4,4'-Bipyridyl | 2,4'-Bipyridyl | 2,3'-Bipyridyl | cis-Stilbene | Acetophenone | Propiophenone |
|---|---|---|---|---|---|---|---|---|
| Positive electrode charge mediator (TTF+) potential | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 |
| Negative electrode charge mediator potential | 0.15 | 0.15 | 0.15 | 0.15 | 0.15 | 0.15 | 0.15 | 0.15 |
| Negative electrode discharge mediator potential | 0.4 | 0.3 | 1.22 | 0.54 | 0.58 | 0.43 | 1.29 | 0.42 |
| Flow battery charge voltage | 3.55 | 3.55 | 3.55 | 3.55 | 3.55 | 3.55 | 3.55 | 3.55 |
| Flow battery discharge voltage | 3 | 3.1 | 2.18 | 2.86 | 2.82 | 2.97 | 2.11 | 2.98 |
| Flow battery theoretical capacity density | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 |
| Power generating element volume filling factor | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 |

| Negative electrode discharge mediator | Butyrophenone | Valerophenone | Ethylene diamine | Benzil | Tetraphenyl-cyclo-pentadienone | Benzophenone |
|---|---|---|---|---|---|---|
| Positive electrode charge mediator (TTF+) potential | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 |
| Negative electrode charge mediator potential | 0.15 | 0.15 | 0.15 | 0.15 | 0.15 | 0.15 |
| Negative electrode discharge mediator potential | 0.3 | 0.31 | 0.36 | 0.16 | 0.34 | 0.78 |
| Flow battery charge voltage | 3.55 | 3.55 | 3.55 | 3.55 | 3.55 | 3.55 |
| Flow battery discharge voltage | 3.1 | 3.09 | 3.04 | 3.24 | 3.06 | 2.62 |
| Flow battery theoretical capacity density | 317 | 317 | 317 | 317 | 317 | 317 |
| Flow battery theoretical energy density | 982.7 | 979.53 | 963.68 | 1027.08 | 970.02 | 315 |
| Power generating element volume filling factor | 0.6 | 0.6 | 0.6 | 0.6 | 0.6 | 0.6 |

TABLE 11-continued

| | | | | | | |
|---|---|---|---|---|---|---|
| Flow battery energy density | 589.62 | 587.718 | 578.208 | 616.248 | 582.012 | 189 |

TABLE 12

Case of using acenaphthene as negative electrode charge mediator
(Negative electrode active material: graphite)

| Negative electrode discharge mediator | 2,2'-Bipyridyl | trans-Stilbene | 4,4'-Bipyridyl | 2,4'-Bipyridyl | 2,3'-Bipyridyl | cis-Stilbene | Acetophenone | Propiophenone |
|---|---|---|---|---|---|---|---|---|
| Positive electrode charge mediator (TTF+) potential | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 |
| Negative electrode charge mediator potential | 0.016 | 0.016 | 0.016 | 0.016 | 0.016 | 0.016 | 0.016 | 0.016 |
| Negative electrode discharge mediator potential | 0.4 | 0.3 | 1.22 | 0.54 | 0.58 | 0.43 | 1.29 | 0.42 |
| Flow battery charge voltage | 3.684 | 3.684 | 3.684 | 3.684 | 3.684 | 3.684 | 3.684 | 3.684 |
| Flow battery discharge voltage | 3 | 3.1 | 2.18 | 2.86 | 2.82 | 2.97 | 2.11 | 2.98 |
| Flow battery theoretical capacity density | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 |
| Power generating element volume filling factor | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 |

| Negative electrode discharge mediator | Butyrophenone | Valerophenone | Ethylene-diamine | Benzil | Tetraphenyl-cyclopentadienone | Benzophenone |
|---|---|---|---|---|---|---|
| Positive electrode charge mediator (TTF+) potential | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 |
| Negative electrode charge mediator potential | 0.016 | 0.016 | 0.016 | 0.016 | 0.016 | 0.016 |
| Negative electrode discharge mediator potential | 0.3 | 0.31 | 0.36 | 0.16 | 0.34 | 0.78 |
| Flow battery charge voltage | 3.684 | 3.684 | 3.684 | 3.684 | 3.684 | 3.684 |
| Flow battery discharge voltage | 3.1 | 3.09 | 3.04 | 3.24 | 3.06 | 2.62 |
| Flow battery theoretical capacity density | 317 | 317 | 317 | 317 | 317 | 317 |
| Flow battery theoretical energy density | 982.7 | 979.53 | 963.68 | 1027.08 | 970.02 | 830.54 |
| Power generating element volume filling factor | 0.6 | 0.6 | 0.6 | 0.6 | 0.6 | 0.6 |
| Flow battery energy density | 589.62 | 587.718 | 578.208 | 616.248 | 582.012 | 498.324 |

Case of using acenaphthylene as negative electrode charge mediator
(Negative active electrode material: graphite)

| Negative electrode discharge mediator | 2,2'-Bipyridyl | trans-Stilbene | 4,4'-Bipyridyl | 2,4'-Bipyridyl | 2,3'-Bipyridyl | cis-Stilbene | Acetophenone | Propiophenone |
|---|---|---|---|---|---|---|---|---|
| Positive electrode charge mediator (TTF+) potential | 3.7 | 3.7 | 3.7 | 3.7 | 3.7 | 3.7 | 3.7 | 3.7 |

TABLE 12-continued

| | | | | | | | | |
|---|---|---|---|---|---|---|---|---|
| Positive electrode discharge mediator (TTF) potential | 3.4 | 3.4 | 3.4 | 3.4 | 3.4 | 3.4 | 3.4 | 3.4 |
| Negative electrode charge mediator potential | 0.014 | 0.014 | 0.014 | 0.014 | 0.014 | 0.014 | 0.014 | 0.014 |
| Negative electrode discharge mediator potential | 0.4 | 0.3 | 1.22 | 0.54 | 0.58 | 0.43 | 1.29 | 0.42 |
| Flow battery charge voltage | 3.686 | 3.686 | 3.686 | 3.686 | 3.686 | 3.686 | 3.686 | 3.686 |
| Flow battery discharge voltage | 3 | 3.1 | 2.18 | 2.86 | 2.82 | 2.97 | 2.11 | 2.98 |
| Flow battery theoretical capacity density | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 |
| Power generating element volume filling factor | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 |

| | | | | | | |
|---|---|---|---|---|---|---|
| Negative electrode discharge mediator | Butyrophenone | Valerophenone | Ethylene diamine | Benzil | Tetraphenyl-cyclo-pentadienone | Benzophenone |
| Positive electrode charge mediator (TTF+) potential | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 |
| Negative electrode charge mediator potential | 0.014 | 0.014 | 0.014 | 0.014 | 0.014 | 0.014 |
| Negative electrode discharge mediator potential | 0.3 | 0.31 | 0.36 | 0.16 | 0.34 | 0.78 |
| Flow battery charge voltage | 3.686 | 3.686 | 3.686 | 3.686 | 3.686 | 3.686 |
| Flow battery discharge voltage | 3.1 | 3.09 | 3.04 | 3.24 | 3.06 | 2.62 |
| Flow battery theoretical capacity density | 317 | 317 | 317 | 317 | 317 | 317 |
| Flow battery theoretical energy density | 982.7 | 979.53 | 963.68 | 1027.08 | 970.02 | 830.54 |
| Power generating element volume filling factor | 0.6 | 0.6 | 0.6 | 0.6 | 0.6 | 0.63 |
| Flow battery energy density | 589.62 | 587.718 | 578.208 | 616.248 | 582.012 | 523.24 |

TABLE 13

Case of using fluoranthene as negative electrode charge mediator
(Negative electrode active material: graphite)

| | | | | | | | | |
|---|---|---|---|---|---|---|---|---|
| Negative electrode discharge mediator | 2,2'-Bipyridyl | trans-Stilbene | 4,4'-Bipyridyl | 2,4'-Bipyridyl | 2,3'-Bipyridyl | cis-Stilbene | Acetophenone | Propiophenone |
| Positive electrode charge mediator (TTF+) potential | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 |
| Negative electrode charge mediator potential | 0.014 | 0.014 | 0.014 | 0.014 | 0.014 | 0.014 | 0014 | 0.014 |
| Negative electrode discharge mediator potential | 0.4 | 0.3 | 1.22 | 0.54 | 0.58 | 0.43 | 1.29 | 0.42 |
| Flow battery charge voltage | 3.686 | 3.686 | 3.686 | 3.686 | 3.686 | 3.686 | 3.686 | 3.686 |

TABLE 13-continued

| | | | | | | | |
|---|---|---|---|---|---|---|---|
| Flow battery discharge voltage | 3 | 3.1 | 2.18 | 2.86 | 2.82 | 2.97 | 2.11 | 2.98 |
| Flow battery theoretical capacity density | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 |
| Power generating element volume filling factor | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 |

| | | | | | | |
|---|---|---|---|---|---|---|
| Negative electrode discharge mediator | Butyrophenone | Valerophenone | Ethylene diamine | Benzil | Tetraphenyl-cyclo-pentadienone | Benzophenone |
| Positive electrode charge mediator (TTF+) potential | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 |
| Negative electrode charge mediator potential | 0.014 | 0.014 | 0.014 | 0.014 | 0.014 | 0.014 |
| Negative electrode discharge mediator potential | 0.3 | 0.31 | 0.36 | 0.16 | 0.34 | 0.78 |
| Flow battery charge voltage | 3.686 | 3.686 | 3.686 | 3.686 | 3.686 | 3.686 |
| Flow battery discharge voltage | 3.1 | 3.09 | 3.04 | 3.24 | 3.06 | 2.62 |
| Flow battery theoretical capacity density | 317 | 317 | 317 | 317 | 317 | 317 |
| Flow battery theoretical energy density | 982.7 | 979.53 | 963.68 | 1027.08 | 970.02 | 830.54 |
| Power generating element volume filling factor | 0.6 | 0.6 | 0.6 | 0.6 | 0.6 | 0.6 |
| Flow battery energy density | 589.62 | 587.718 | 578.208 | 616.248 | 582.012 | 498.324 |

Case of using anthracene as negative electrode charge mediator
(Negative electrode active material: graphite)

| | | | | | | | | |
|---|---|---|---|---|---|---|---|---|
| Negative electrode discharge mediator | 2,2'-Bipyridyl | trans-Stilbene | 4,4'-Bipyridyl | 2,4'-Bipyridyl | 2,3'-Bipyridyl | cis-Stilbene | Acetophenone | Propiophenone |
| Positive electrode charge mediator (TTF+) potential | 3.7 | 3.7 | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 | 3.4 | 3.4 |
| Negative electrode charge mediator potential | 0.05 | 0.05 | 0.05 | 0.05 | 0.05 | 0.05 | 0.05 | 0.05 |
| Negative electrode discharge mediator potential | 0.4 | 0.3 | 1.22 | 0.54 | 0.58 | 0.43 | 1.29 | 0.42 |
| Flow battery charge voltage | 3.65 | 3.65 | 3.65 | 3.65 | 3.65 | 3.65 | 3.65 | 3.65 |
| Flow battery discharge voltage | 3 | 3.1 | 2.18 | 2.86 | 2.82 | 2.97 | 2.11 | 2.98 |
| Flow battery theoretical capacity density | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 |
| Power generating element volume filling factor | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 |

TABLE 13-continued

| Negative electrode discharge mediator | Butyrophenone | Valerophenone | Ethylene diamine | Benzil | Tetraphenyl-cyclo-pentadienone | Benzophenone |
|---|---|---|---|---|---|---|
| Positive electrode charge mediator (TTF+) potential | 3.7 | 3.7 | 3.7 | 3.7 | 3.7 | 3.7 |
| Positive electrode discharge mediator (TTF) potential | 3.4 | 3.4 | 3.4 | 3.4 | 3.4 | 3.4 |
| Negative electrode charge mediator potential | 0.05 | 0.05 | 0.05 | 0.05 | 0.05 | 0.05 |
| Negative electrode discharge mediator potential | 0.3 | 0.31 | 0.36 | 0.16 | 0.34 | 0.78 |
| Flow battery charge voltage | 3.65 | 3.65 | 3.65 | 3.65 | 3.65 | 3.65 |
| Flow battery discharge voltage | 3.1 | 3.09 | 3.04 | 3.24 | 3.06 | 2.62 |
| Flow battery theoretical capacity density | 317 | 317 | 317 | 317 | 317 | 317 |
| Flow battery theoretical energy density | 982.7 | 979.53 | 963.68 | 1027.08 | 970.02 | 830.54 |
| Power generating element volume filling factor | 0.6 | 0.6 | 0.6 | 0.6 | 0.6 | 0.6 |
| Flow battery energy density | 589.62 | 587.718 | 578.208 | 616.248 | 582.012 | 498.324 |

In Table 7 and Table 10, the estimation results on the energy density under the conditions of the operation examples of flow battery 3000 according to the second embodiment described above in a case in which charge mediator 111 is biphenyl or phenanthrene and discharge mediator 112 is 2,2'-bipyridyl or trans-stilbene are presented.

As presented in Table 7, the energy density of flow battery is estimated to be 571 Wh/L in a case in which charge mediator 111 is biphenyl or phenanthrene and discharge mediator 112 is 2,2'-bipyridyl.

As presented in Table 7, the energy density of flow battery is estimated to be 590 Wh/L in a case in which charge mediator 111 is biphenyl or phenanthrene and discharge mediator 112 is trans-stilbene.

In contrast to these, the theoretical energy density of the conventional flow battery in which vanadium is utilized is about 38 Wh/L. From this result, it can be seen that the theoretical energy density of the flow battery of the present disclosure is outstandingly higher than that of the conventional flow battery.

Third Embodiment

A third embodiment will be described below. Incidentally, the description which overlaps with either of those of the first and second embodiments will be appropriately omitted.

Figure 4:
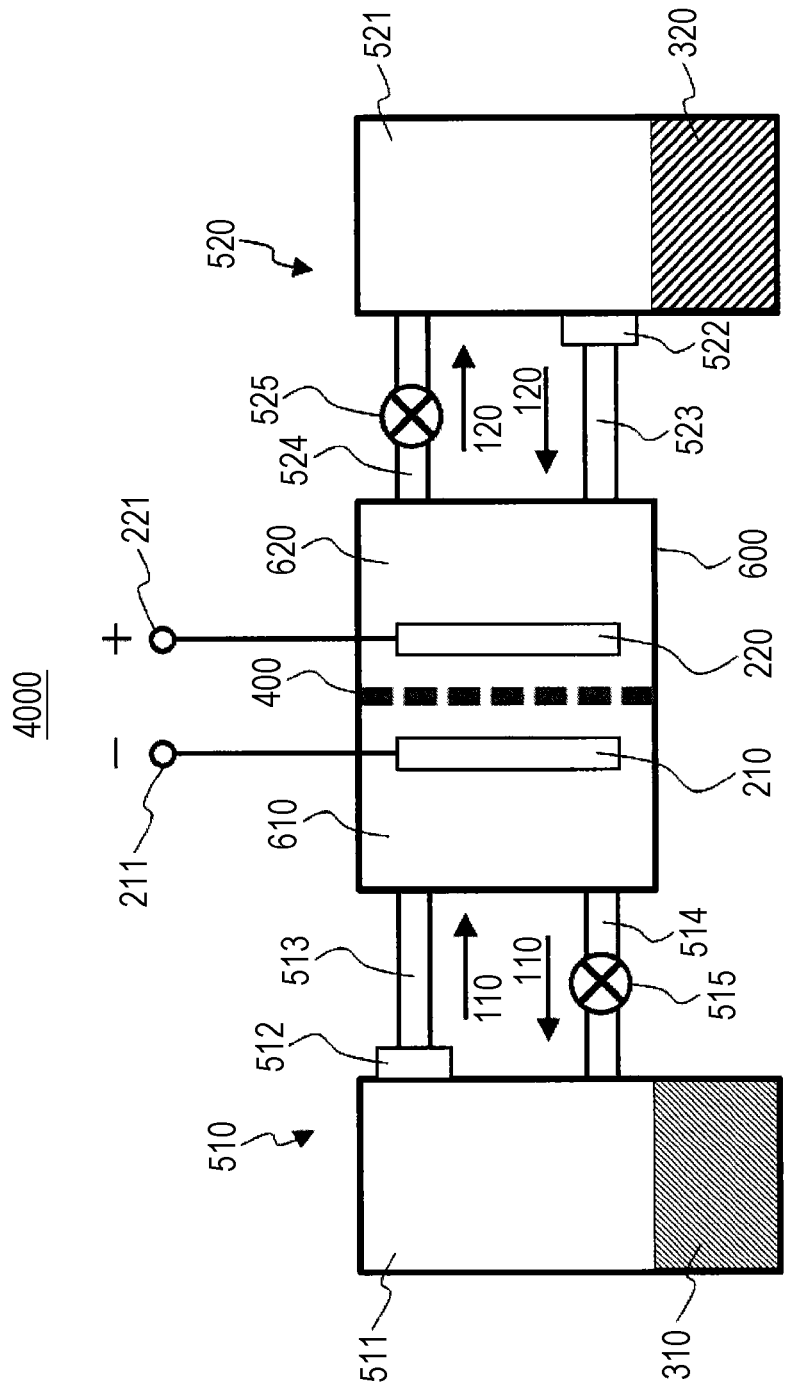
FIG. 4 is a schematic diagram of a flow battery according to a third embodiment.

FIG. 4 is a block diagram exemplarily illustrating a schematic configuration of flow battery 4000 according to the third embodiment.

Flow battery 4000 according to the third embodiment has the following configuration in addition to the configuration of flow battery 3000 according to the second embodiment described above.

First, flow battery 4000 according to the third embodiment has the configuration of first circulation mechanism 510 described in the first embodiment.

Furthermore, flow battery 4000 according to the third embodiment includes electrochemical reaction unit 600, positive electrode terminal 221, and negative electrode terminal 211 described in the first embodiment.

Furthermore, in flow battery 4000 according to the third embodiment, second circulation mechanism 520 includes second chamber 521.

Second active material 320 and second liquid 120 are contained in second chamber 521.

Second circulation mechanism 520 circulates second liquid 120 between second electrode 220 and second chamber 521.

For example, as second active material 320 and second liquid 120 come into contact with each other in second chamber 521, second electrode mediator 121 is oxidized or reduced by second active material 320.

According to the above configuration, second liquid 120 and second active material 320 can be brought into contact with each other in second chamber 521. This makes it possible to further increase, for example, the contact area between second liquid 120 and second active material 320. In addition, the contact time between second liquid 120 and second active material 320 can be extended. For this reason, the oxidation reaction and reduction reaction of second electrode mediator 121 by second active material 320 can be more efficiently performed.

Incidentally, second chamber 521 may be, for example, a tank in the third embodiment.

In addition, second chamber 521 may contain, for example, second liquid 120 in which second electrode mediator 121 is dissolved in the gap between filled second active materials 320.

In addition, in flow battery 4000 according to the third embodiment, second circulation mechanism 520 may include pipe 523, pipe 524, and pump 525 as illustrated in FIG. 4.

One end of pipe 523 is connected to the outlet of second liquid 120 in second chamber 521.

The other end of pipe 523 is connected to one in which second electrode 220 is disposed between positive electrode chamber 620 and negative electrode chamber 610. In FIG. 4, the other end of pipe 523 is connected to positive electrode chamber 620.

The other end of pipe 524 is connected to one in which second electrode 220 is disposed between positive electrode chamber 620 and negative electrode chamber 610. In FIG. 4, one end of pipe 524 is connected to positive electrode chamber 620.

The other end of pipe 524 is connected to the inlet of second liquid 120 in second chamber 521.

Pump 525 is provided, for example, in pipe 524. Alternatively, pump 525 may be provided in pipe 523. Pump 525 may be a magnetically driven pump of which the portion to be in contact with second liquid 120 is composed of a resin nonreactive with lithium. The magnetically driven pump may be, for example, a magnetically levitated pump illustrated in FIG. 5. The magnetically driven pump is driven by a magnet, and thus the impeller can be rotated in a sealed vessel, sealless driving is possible, and liquid leakage can be prevented. In addition, pump 525 may be composed of, for example, Teflon (registered trademark) resin.

Incidentally, in flow battery 4000 according to the third embodiment, second circulation mechanism 520 may include second transmission suppressing unit 522.

Second transmission suppressing unit 522 suppresses the transmission of second active material 320.

Second transmission suppressing unit 522 is provided on a path through which second liquid 120 flows out from second chamber 521 to second electrode 220. In FIG. 4, second transmission suppressing unit 522 is provided in pipe 523.

According to the above configuration, it is possible to suppress the outflow of second active material 320 to places (for example, second electrode 220 side) other than second chamber 521. In other words, second active material 320 remains in second chamber 521. This makes it possible to realize a flow battery having a configuration in which second active material 320 itself is not circulated. For this reason, it is possible to prevent the inside of the members of second circulation mechanism 520 from clogging with second active material 320. In addition, it is possible to suppress the occurrence of resistance loss due to outflow of second active material 320 to the second electrode 220 side. The member of second circulation mechanism 520 may be, for example, a pipe.

Second transmission suppressing unit 522 may be provided at, for example, the junction between second chamber 521 and pipe 523.

Second transmission suppressing unit 522 may be, for example, a filter through which second active material 320 is filtered. At this time, the filter may be a member having pores smaller than the minimum particle size of the particles of second active material 320. As a material for the filter, a material which does not react with second active material 320, second liquid 120 and the like may be used. The filter may be, for example, glass fiber filter paper, a polypropylene non-woven fabric, a polyethylene non-woven fabric, and a metal mesh which does not react with metal lithium.

According to the above configuration, it is possible to prevent the outflow of second active material 320 from second chamber 521 even when the flow of second active material 320 occurs together with the flow of second liquid 120 inside second chamber 521.

In the example illustrated in FIG. 4, second liquid 120 contained in second chamber 521 passes through second transmission suppressing unit 522 and pipe 523 and is supplied to positive electrode chamber 620.

By this, second electrode mediator 121 dissolved in second liquid 120 is oxidized or reduced on second electrode 220.

Thereafter, second liquid 120 in which oxidized or reduced second electrode mediator 121 is dissolved passes through pipe 524 and pump 525 and is supplied to second chamber 521.

By this, second electrode mediator 121 dissolved in second liquid 120 is oxidized or reduced by second active material 320.

Incidentally, the circulation of second liquid 120 may be controlled by, for example, pump 525. In other words, pump 525 appropriately starts the supply of second liquid 120 or stops the supply or adjusts the supply amount and the like.

In addition, the circulation of second liquid 120 may be controlled by means other than pump 525. Other means may be, for example, a valve.

The presence or absence of liquid leakage from the flow battery in the case of using a lithium biphenyl solution in which metal lithium is dissolved in biphenyl which can be used as charge mediator 111 and the presence or absence of color change of the lithium biphenyl solution due to the reaction with the pump member and resin member were evaluated by the following methods.

In a solution of 2-methyltetrahydrofuran (2MeTHF), 0.1 mol/L biphenyl and 1 mol/L LiPF$_6$ which was an electrolyte salt were respectively dissolved, and an excessive amount of metal lithium was further immersed in the solution, thereby preparing a lithium biphenyl solution in which a saturated amount of lithium was dissolved. This solution was circulated for 1 week using a magnetically driven pump of which the portion to be in contact with the lithium biphenyl solution was composed of polypropylene (mode 1), and the presence or absence of the liquid leakage and the presence or absence of the color change of the solution due to the reaction with the members were visually confirmed. Meanwhile, in a case in which this solution was circulated between the chamber accommodating the active material and the liquid and the electrode using a plunger type pump (mode 2) and a diaphragm type pump (mode 3) which were excellent in the control of flow rate and the quantitativity as well, the presence or absence of the liquid leakage and the presence or absence of the color change of the solution due to the reaction with the members were visually confirmed. The results are presented in Table 14.

TABLE 14

| Evaluated item | Mode 1 | Mode 2 | Mode 3 |
| --- | --- | --- | --- |
| Liquid leakage | Absence | Presence | Absence |
| Liquid color change | Absence | Slight presence | Presence |

As presented in Table 14, the liquid leakage and the color change of liquid were not confirmed in the solutions subjected to mode 1 in which the solution was circulated using a magnetically driven pump of which the portion to be in contact with the lithium biphenyl solution was composed of polypropylene. In contrast to this, with regard to the solutions circulated using other pumps, liquid leakage was confirmed in about three days in mode 2 and the color change of the solution was confirmed in about one day in mode 3. The liquid leakage and color change in mode 2 are caused by the wearing of the interior of the plunger and the deterioration of the seal portion. It has been confirmed that the color change of the solution in mode 3 is caused by the reaction with Teflon resin constituting the diaphragm.

In mode 1, it is possible to realize a flow battery equipped with both a high energy density and high reliability.

Incidentally, the configurations described in each of the first to third embodiments may be appropriately combined with one another.

INDUSTRIAL APPLICABILITY

The flow battery of the present disclosure can be suitably used, for example, as a storage device.

REFERENCE SIGNS LIST

110: first liquid
111: charge mediator
112: discharge mediator
120: second liquid
121: second electrode mediator
210: first electrode
220: second electrode
310: first active material
320: second active material
400: isolation unit
510: first circulation mechanism
511: first chamber
512: first transmission suppressing unit
515: magnetically driven pump
5151: casing
5152: impeller
5153: rotor magnet
5154: stator for motor and magnetic bearing
5155: coil for motor and magnetic bearing
5156: suction port
5157: ejection port
520: second circulation mechanism
521: second chamber
522: second transmission suppressing unit
600: electrochemical reaction unit
610: negative electrode chamber
620: positive electrode chamber
1000, 2000, 3000, 4000: flow battery

The invention claimed is:

1. A flow battery comprising:
a first liquid containing a lithium ion and a first redox material;
a first electrode in contact with the first liquid;
a second electrode functioning as a counter electrode of the first electrode;
an isolation unit that isolates the first electrode and the second electrode from each other;
a first chamber;
a first circulation mechanism for circulating the first liquid between the first electrode and the first chamber;
a second liquid containing a second redox material; and
a second active material immersed in the second liquid, wherein:
the first liquid is non-aqueous,
the first circulation mechanism includes a magnetically driven pump,
the magnetically driven pump includes a casing and an impeller,
an inner surface of the casing is formed of a resin nonreactive with lithium,
a surface of the impeller is formed of the resin nonreactive with lithium,
the second electrode is in contact with the second liquid,
the isolation unit isolates the first electrode from the second electrode,
the isolation unit isolates the first liquid from the second liquid,
the second redox material is oxidized or reduced on the second electrode,
the second redox material is oxidized or reduced by the second active material, and
the second redox material is tetrathiafulvalene.

2. The flow battery according to claim 1, wherein the resin nonreactive with lithium is a polyolefin-based resin.

3. The flow battery according to claim 2, wherein
the polyolefin-based resin is at least one selected from the group consisting of polyethylene and polypropylene.

4. The flow battery according to claim 1, wherein
the resin nonreactive with lithium contains at least one selected from the group consisting of polyethylene and polypropylene.

5. The flow battery according to claim 1, wherein the first redox material is an aromatic compound.

6. The flow battery according to claim 1, wherein
a first active material having a property to contain and release lithium is immersed in the first liquid.

7. The flow battery according to claim 6, wherein
the first active material and the first liquid are contained in the first chamber.

8. The flow battery according to claim 6, wherein
the first redox material contains a charge mediator and a discharge mediator,
an equilibrium potential of the charge mediator is lower than an equilibrium potential of the first active material, and
an equilibrium potential of the discharge mediator is higher than an equilibrium potential of the first active material.

9. The flow battery according to claim 8, wherein
lithium is dissolved in the first liquid,
during charge, the charge mediator is reduced on the first electrode and the first active material contains the lithium as well as the charge mediator reduced on the first electrode is oxidized by the first active material, and
during discharge, the first active material releases the lithium as well as the first active material containing the lithium reduces the discharge mediator and the discharge mediator reduced by the first active material is oxidized on the first electrode.

10. The flow battery according to claim 9, wherein
during the charge, the discharge mediator is reduced on the first electrode, and
during the discharge, the charge mediator is oxidized on the first electrode.

11. The flow battery according to claim 8, wherein
the charge mediator is at least one selected from the group consisting of phenanthrene, biphenyl, o-terphenyl, triphenylene, anthracene, acenaphthene, acenaphthylene, and fluoranthene.

12. The flow battery according to claim 8, wherein
the discharge mediator is at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, benzil, and tetraphenylcyclopentadienone.

13. The flow battery according to claim 1, wherein
the first liquid is an ether solution.

14. The flow battery according to claim 6, wherein
the first active material contains graphite.

15. The flow battery according to claim 1, wherein
lithium is dissolved in the second liquid,
the second active material has a property to contain and release the lithium,
during charge, the second redox material is oxidized on the second electrode and the second active material releases the lithium as well as the second redox material oxidized on the second electrode is reduced by the second active material, and
during discharge, the second redox material is reduced on the second electrode and the second active material contains the lithium as well as the second redox material reduced on the second electrode is oxidized by the second active material.

16. The flow battery according to claim 1, wherein the second active material contains lithium iron phosphate.

17. The flow battery according to claim 1, comprising
a second chamber for containing the second liquid, the second electrode, and the second active material; and
a second circulation mechanism for circulating the second liquid between the second electrode and the second chamber, wherein
the second redox material is oxidized or reduced by the second active material by contact of the second active material and the second liquid with each other in the second chamber.

* * * * *